United States Patent [19]

Shinoda et al.

[11] Patent Number: 5,414,252
[45] Date of Patent: May 9, 1995

[54] HIGH SPEED SCAN BAR CODE READER WHICH CAN READ MORE THAN ONE TYPE OF BAR CODE

[75] Inventors: Ichiro Shinoda; Tomoyuki Kashiwazaki; Akira Okawado; Kazumasa Moriya; Shinichi Sato; Motohiko Itoh; Mitsuo Watanabe; Hiroaki Kawai, all of Kawasaki, Japan

[73] Assignee: Fujitsu Limited, Japan

[21] Appl. No.: 833,493

[22] Filed: Feb. 10, 1992

[30] Foreign Application Priority Data

Feb. 8, 1991 [JP] Japan .................................. 3-016719
Feb. 18, 1991 [JP] Japan .................................. 3-023228

[51] Int. Cl.6 .............................................. G06K 7/10
[52] U.S. Cl. ..................................... 235/463; 235/466
[58] Field of Search ............... 235/454, 462, 436, 463, 235/466

[56] References Cited

U.S. PATENT DOCUMENTS

| | | | |
|---|---|---|---|
| 4,667,089 | 5/1987 | Shirakabe et al. | 235/462 |
| 4,743,744 | 5/1988 | Nakase | 235/472 |
| 4,855,581 | 8/1989 | Mertel et al. | 235/462 |
| 5,081,342 | 1/1992 | Knowles | 235/462 |
| 5,142,130 | 8/1992 | Sato | 235/462 |
| 5,189,289 | 2/1993 | Watanabe | 235/462 |

*Primary Examiner*—Donald Hajec
*Assistant Examiner*—Edward Sikorski
*Attorney, Agent, or Firm*—Staas & Halsey

[57] ABSTRACT

A bar code reader using a high speed scanner, containing: a scanning unit scanning a surface on which a bar code is printed; a bar width detecting unit successively detecting widths of bars; a bar width storing unit storing the widths; an address generating unit generating an address of the bar width storing unit at which each of the widths is to be stored; a fast screening unit determining whether a set of widths successively detected by the bar width detecting unit satisfies a predetermined condition for the set of widths constituting a complete bar code; and a bar code decoding unit reading a set of successive widths from the generated address, and decoding the bar code determined by the complete bar code detecting unit. A type of bar code detecting unit detecting a type of bar code constituted by the detected widths, and an address & type storing unit storing the detected type of bar code, together with information on the generated addresses for the widths of the bar code, may be inserted. The bar code decoding unit contains specific type decoding units for respectively decoding types of bar codes. The bar code decoding unit reads the stored widths from the addresses indicated by the information stored in the address & type storing unit, and decodes the bar code using one of the specific type decoding unit corresponding to the type stored in the address & type storing unit together with the above information.

25 Claims, 25 Drawing Sheets

Fig. 12

(CODE 39)

| CHARACTER | BAR CODE PATTERN | BARS | SPACES |
|---|---|---|---|
| 1 | | 1 0 0 0 1 | 0 1 0 0 |
| M | | 1 1 0 0 0 | 0 0 0 1 |

HIGH SPEED SCAN BAR CODE READER WHICH CAN READ MORE THAN ONE TYPE OF BAR CODE

BACKGROUND OF THE INVENTION (1) Field of the Invention

The present invention relates to a bar code reader using a high speed hands-free scanner, which is used in the field of the distribution and transportation industries, and retail stores for selling commodities. For example, the bar code reader with a scanner is used with POS (point of sale) terminal equipment.

(2) Description of the Related Art

There are two types of scanners used for bar code readers. In one type, scanning is carried out at high speed, and in the other type, the scanning speed is low. The low speed scanning is used in, for example, pen-type, gun-type, and touch-type bar code readers where the operator holds and applies a handy scanner unit to a surface of an article of commerce on which a bar code is printed. In such a bar code reader using a low speed scanning, decoding of the bar code read by the scanning is carried out by software. Therefore, when programs for decoding a plurality of types of bar codes are installed in such a bar code reader using low speed scanning, the bar code reader can read the plurality of types of bar codes with no substantial increase in hardware.

However, the reading speed in the above bar code reader using low speed scanning is very low because of the low scanning speed, and the hand operation for applying the scanning unit is bothersome. Therefore, hands-free high speed scanners are now used for bar code reading with POS terminal equipment. In the bar code reader using the hands-free high speed scanner, laser beams for scanning a bar code at high speed in various directions, are successively outlet or projected from a window of a fixed scanner, and the operator places an article of commerce on the window so that the surface on which a bar code is printed is exposed to the laser beams.

Conventionally, the decoding of the bar codes read by the above high speed scanner, is carried out by a hardware logic circuit designed to decode a specific type of bar code, and all bar width data read by the above successive scanning beams are supplied to the hardware logic circuit to be decoded. The software decoding cannot be used in the bar code reader using the high speed scanning because the scanning speed is very high (several hundreds meters/sec), which generates electric signals having periods of a few microseconds, the scanner successively supplies all the bar width data to the hardware logic circuit, and thus, high speed data processing is required for decoding the successive bar width data, but the decoding speed using software is too slow to decode the above successive bar width data.

There are a plurality of types (standards) of bar codes such as the UPC codes (including the EAN code in Europe and the JAN code in Japan) which are widely used in the field of the distribution industry, the CODE 39 which is used in manufacturing industries, the Interleaved 2 of 5 which is used in the transportation industries, the Codabar, and CODE 128. As mentioned above, conventionally, every bar code reader using the high speed scanner can read bar codes of one type only (bar codes in accordance with one standard only). However, more than one type of bar code is often used by one user, and it is required for the bar code reader to read more than one type of bar code.

The simple way for enabling one bar code reader to read more than one type of bar code is to provide a plurality of hardware logic circuits for respectively decoding the different types of bar codes. However, this increases the size and the cost, in particular, when the number of types of bar codes is increased.

SUMMARY OF THE INVENTION

An object of the present invention is to provide a bar code reader using a high speed scanner, which can read a plurality of types of bar codes at a high speed with minimal increase in size and cost.

According to the first aspect of a present invention, there is provided a bar code reader using a high speed scanner, comprising a scanning unit for scanning, with an scanning beam, a surface of, an article on which a bar code comprised of a plurality of elements is printed, and outputting a two-level signal, the levels of which are determined based on whether or not portions of the surface currently scanned are black or white. A bar width detecting unit is used for successively detecting and outputting widths of the respective durations wherein the above levels are unchanged and a bar width storing unit is used for storing the widths detected by the bar width detecting unit. An address generating unit for generating an address of the bar width storing unit at which each of the widths is to be stored is also provided. A fast screening unit, for determining whether or not a set of widths successively detected by the bar width detecting unit satisfies a predetermined necessary condition for the set of widths constituting a complete bar code, along with a bar code decoding unit, for reading a set of successive widths from the addresses of the bar width storing unit where the address is generated by the address generating unit, and decoding a bar code constituted by the set of successive widths when the fast screening unit determines that the set of successive widths satisfies the above predetermined necessary condition, are also provided.

The above determination of the completeness of the scanned bar code may be carried out based on whether or not widths corresponding to predetermined margins on both sides of a bar code are detected.

The address generating unit and the fast screening unit are realized by a construction which enables high speed processing so that processing for all the widths output from the bar width detecting unit are carried out without omission. On the other hand, the bar code decoding unit may be realized by a construction which processes data at a relatively slow speed because the bar code decoding unit operates only when the fast screening unit determines that the above set satisfies the above necessary conditions. For example, the address generating unit and the fast screening unit are preferably constructed by a hardware logic circuit, and the bar code decoding unit may be realized by software.

According to a second aspect of the present invention, there is provided a bar code reader using a high speed scanner, comprising a scanning unit for scanning, with a scanning beam, a surface of an article on which a bar code comprised of a plurality of elements is printed, and outputting a two-level signal, the levels of which are determined based on whether or not portions of the surface currently scanned are black or white. A bar width detecting unit is used for successively detecting and outputting widths of the respective durations wherein the above levels are unchanged and a bar width storing unit is used for storing the widths detected by the bar width detecting unit. An address generating unit for generating an address of the bar width storing unit at which each of the widths is to be stored is a also provided. A fast screening unit for determining whether or not a set of widths successively detected by the bar width detecting unit satisfies a predetermined necessary condition for the set of widths constituting a complete bar code, and a type of bar code detecting unit for detecting a type of bar code the widths elements of which are detected by the above bar width detecting unit, based on the detected widths are also provided along with an address & type storing unit for storing the type of bar code detected by the type of bar code detecting unit, together with information on the above addresses generated by the address generating unit for the widths of the bar code when the fast screening unit determines that the above set of successive widths satisfies the above predetermined necessary condition. A bar code decoding unit, provided with a plurality of specific type decoding units is used for respectively decoding a plurality of types of bar codes. The bar code decoding unit reads the widths stored in the bar width storing unit from the addresses indicated by the information stored in the address & type storing unit, and decodes the bar code constituted by the widths using one of the above specific type decoding units corresponding to the type which is stored in the address & type storing unit together with the above information.

The fast screening unit may contain a unit for determining whether or not widths corresponding to predetermined margins on both sides of a bar code are detected. Further, the type of bar code detecting unit may contain a unit for determining a number of bars detected between the detected margins on both sides of a bar code. Alternatively, the type of bar code detecting unit may contain a unit for determining a length of a character which is constituted by a set of successive widths, and located adjacent to the detected margin, or a unit for determining a relationship between widths of two predetermined widths in a character which is constituted by a set of a successive widths, and located adjacent to the detected margin.

The address generating unit, the fast screening unit, and the type of bar code determining unit should be realized by a construction which enables high speed processing, so that processing for all the widths output from the bar width detecting unit are carried out without omission. On the other hand, the bar code decoding unit may be realized by a construction which processes data at a relatively slow speed because the bar code decoding unit operates only when the fast screening unit determines that the bar code satisfies the necessary conditions, and the type of bar code determining unit determines a type of bar code from the widths detected by the bar width detecting unit. For example, the address generating unit, the fast screening unit, and the type of bar code determining unit are preferably constructed by a hardware logic circuit, and the bar code decoding unit may be realized by software.

BRIEF DESCRIPTION OF THE DRAWINGS

In the drawings:

FIG. 12 depicts examples of the CODE39 characters;

DESCRIPTION OF THE PREFERRED EMBODIMENTS

Figure 1:
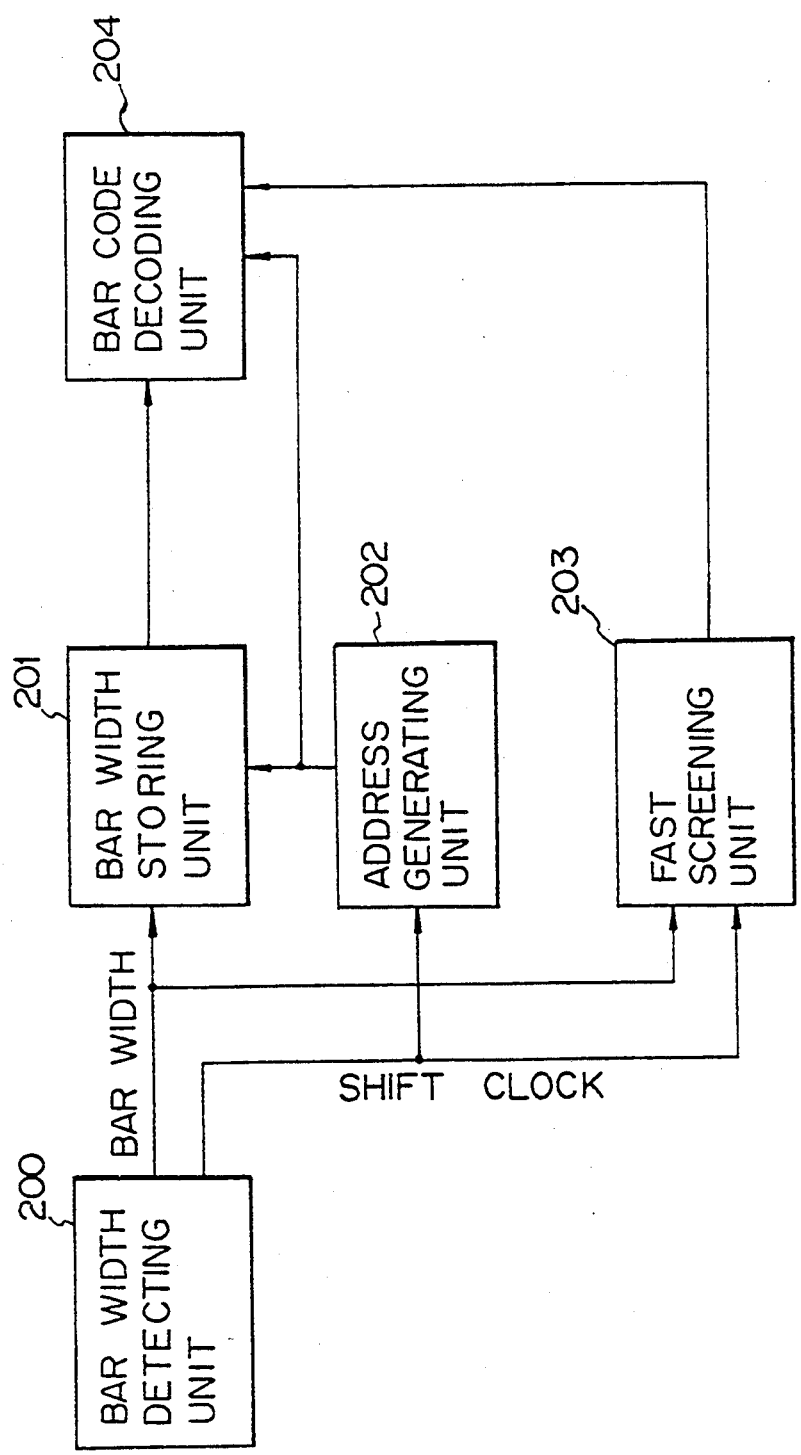
FIG. 1 is a diagram illustrating the basic construction of the first aspect of the present invention.
Figure 2:
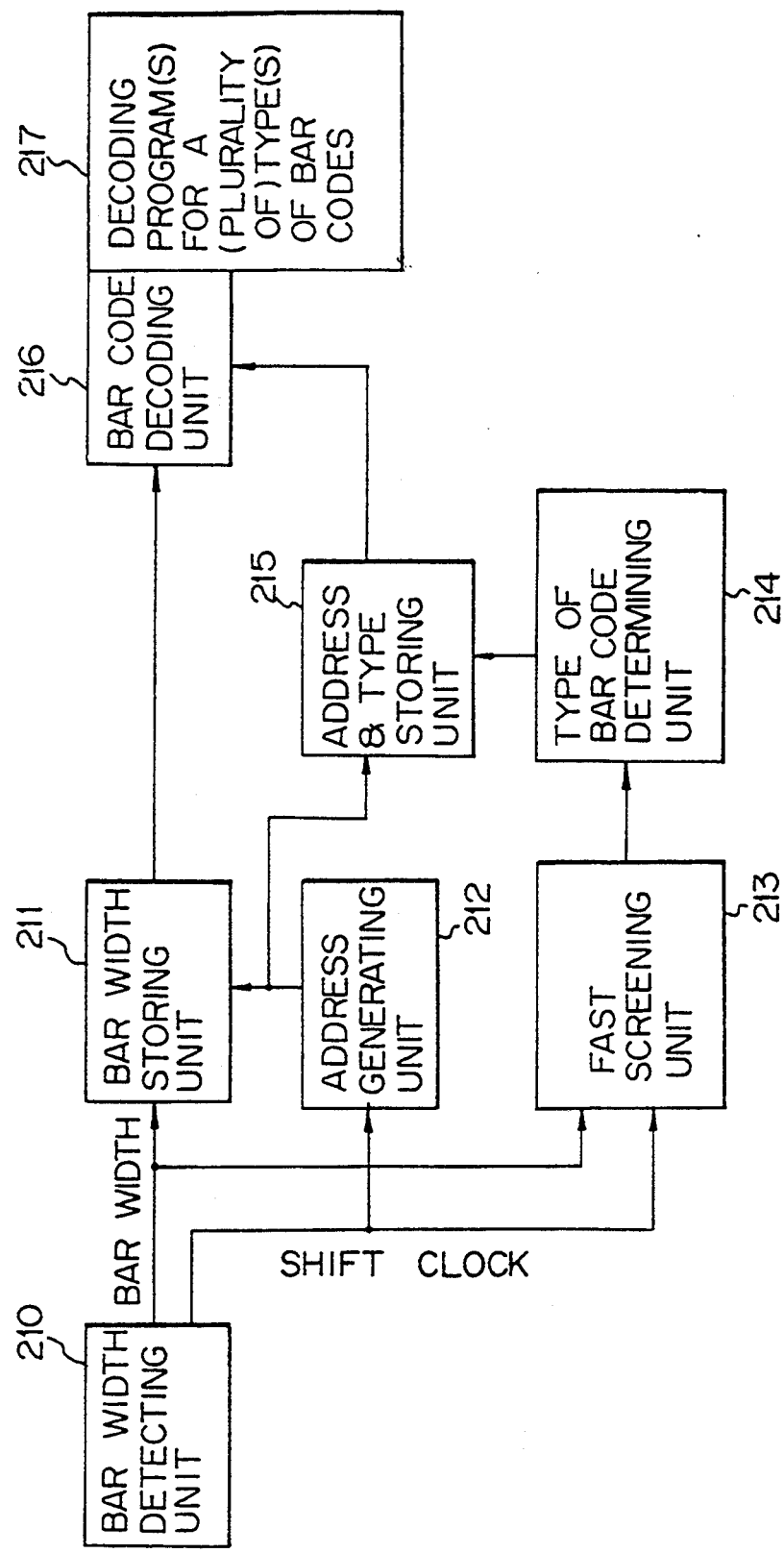
FIG. 2 is a diagram illustrating the basic construction of the second aspect of the present invention.

Basic Operations of the Present Invention (FIGS. 1 and 2)

FIG. 1 is a diagram showing a basic construction of the first aspect of the present invention. In FIG. 1, reference numeral 200 denotes a bar width detecting unit, 201 denotes a bar width storing unit, 202 denotes an address generating unit, 203 denotes a fast screening unit, and 204 denotes a bar code decoding unit.

According to the first aspect of the present invention, the bar width detecting unit 200 successively detects and outputs widths of the signals corresponding to the scanning of black bars and white spaces, respectively. The output of the bar width detecting unit 200 is stored in the bar width storing unit 201, where the address for storing the widths is generated by the address generating unit 202. Parallel to the above, whether or not a set of widths successively detected by the bar width detecting unit satisfies a predetermined necessary condition for the set of widths constituting a complete bar code, is determined by the fast screening unit 203. Only when the fast screening unit determines that the set of successive widths satisfies the above condition, the bar code decoding unit 204 reads a set of successive widths from the addresses of the bar width storing unit where the address is generated by the address generating unit, and decodes a bar code constituted by the set of successive widths.

FIG. 2 is a diagram showing a basic construction of the second aspect of the present invention. In FIG. 2, reference numeral 210 denotes a bar width detecting unit, 211 denotes a bar width storing unit, 212 denotes an address generating unit, 213 denotes a fast screening unit, 214 denotes a type of bar code determining unit, 215 denotes an address & type storing unit, 216 denotes a bar code decoding unit, and 217 denotes a decoding program(s) for a (plurality of) type(s) of bar codes.

According to the second aspect of the present invention, the operations of the bar width detecting unit 210, the bar width storing unit 211, the address generating unit 212, and the fast screening unit 213 are the same as those in the first aspect of present invention.

When, the type of bar code detecting unit 214 detects a type of bar code, the widths of elements of which are detected by the above bar width detecting unit 211, based on the detected widths when the fast screening unit 213 determines that the above set of successive widths satisfies the above predetermined necessary condition, and the detected type of bar code is stored in the address & type storing unit 215, together with information on the above addresses generated by the address generating unit 212 for the widths of the bar code. The bar code decoding unit 216 is provided with a plurality of specific type decoding units (programs 217) for respectively decoding a plurality of types of bar codes. The bar code decoding unit 216 reads the above widths stored in the above bar width storing unit from the addresses indicated by the information stored in the address & type storing unit, and decodes the bar code constituted by the widths using one of the above specific type decoding units (programs 217) corresponding to the type which is stored in the address & type storing unit 215 together with the above information.

Figure 3:
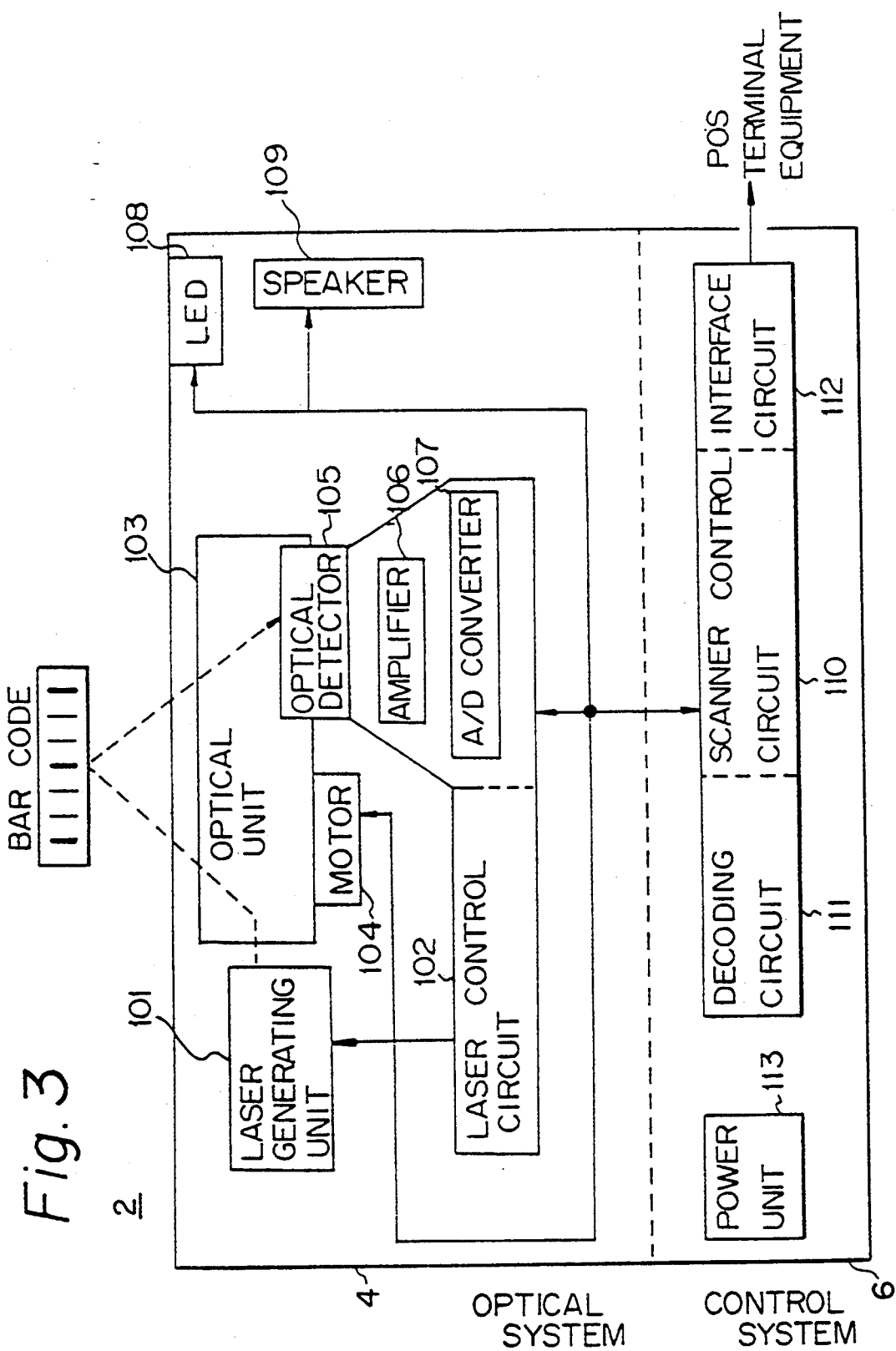
FIG. 3 is a diagram depicting a construction of a bar code reader with a hands-free scanner.

Outline Construction of Bar Code Reader (FIG. 3)

FIG. 3 is a diagram indicating a construction of a bar code reader with a hands-free scanner. The bar code reader with a hands-free scanner 2 comprises an optical system 4 and a control system 6. In the optical system 4, reference numeral 101 denotes a laser generating unit for generating a laser beam, 102 denotes a laser control circuit for controlling the laser generating unit 101, 103 denotes an optical unit for scanning a bar code with the laser beam by using a rotating polygon mirror, 104 denotes a motor for rotating the polygon mirror, 105 denotes an optical detector for receiving a laser beam reflected at the bar code, 106 denotes an amplifier for amplifying an output of the optical detector 105, 107 denotes an analog to digital converter for converting an analog output of the amplifier 106 to a digital value, 108 denotes an LED lamp for indicating status of the bar code reader, and 109 denotes a speaker for notifying an operator that a bar code has been read. The control system 6 comprises a scanner control circuit 110 for controlling the optical system, a decoding circuit 111 for decoding bar code data supplied from the analog to digital converter 107, and an interface circuit 112 with POS terminal equipment.

Figure 4:
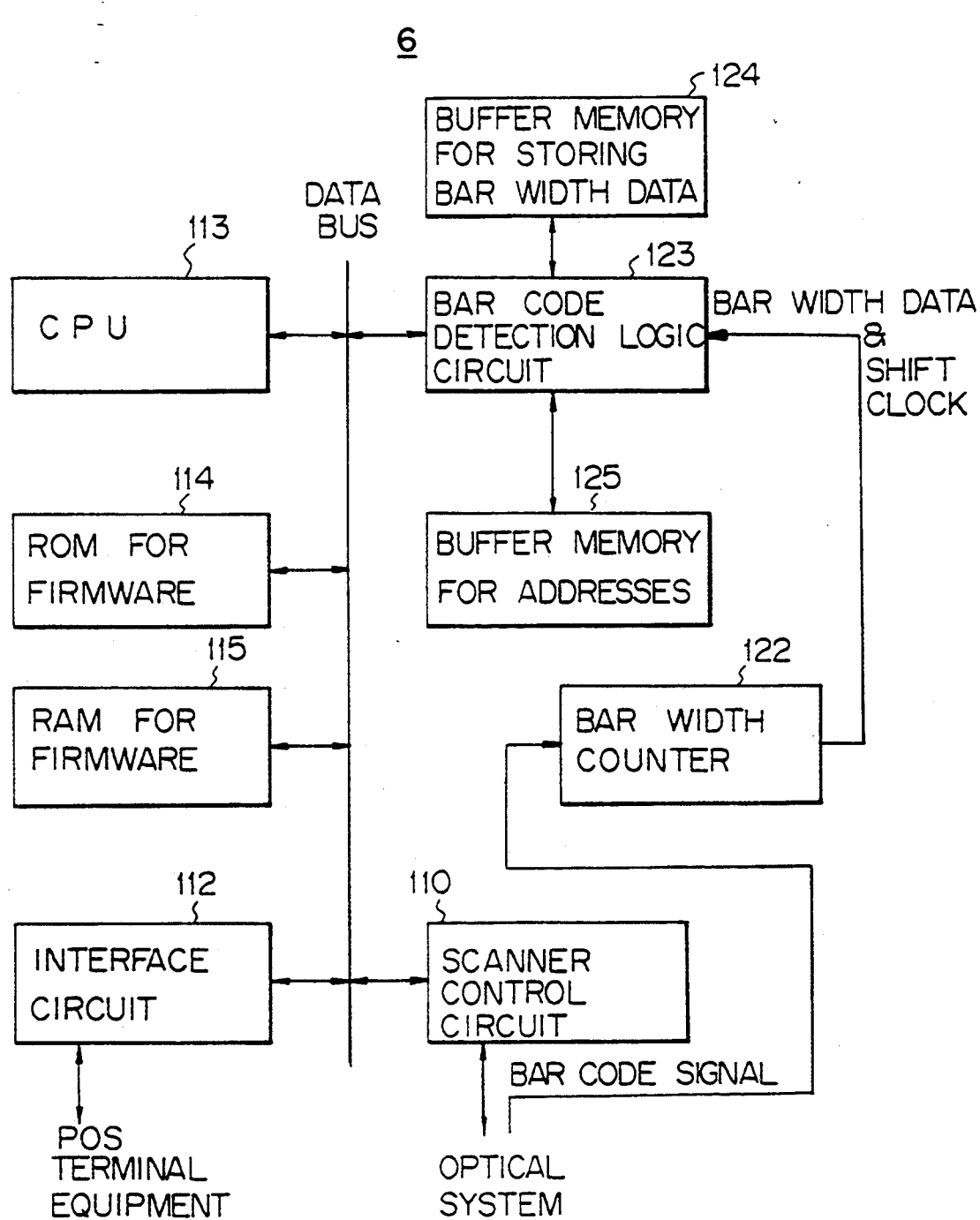
FIG. 4 is a diagram illustrating the control system in FIG. 3, according to an embodiment of the present invention.
Figure 5:
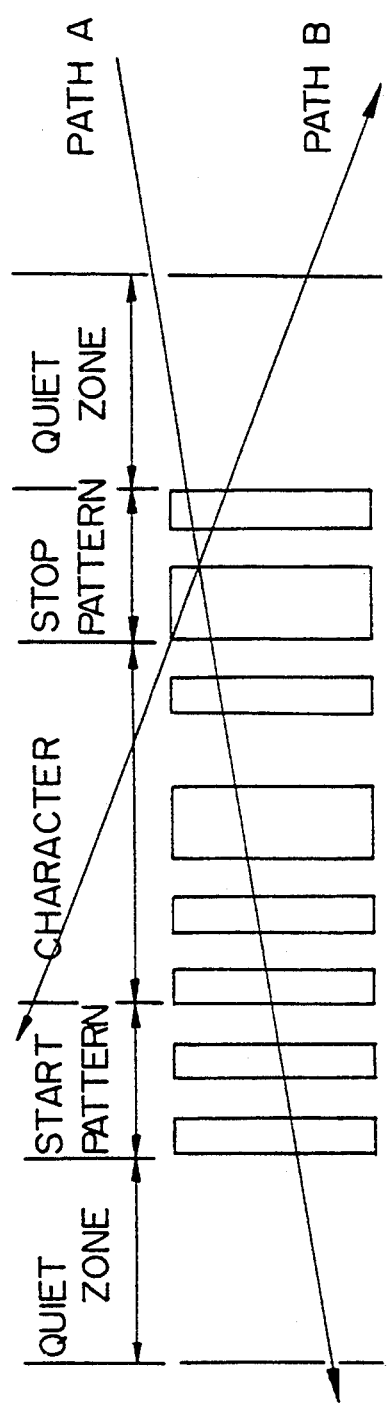
FIG. 5 depicts two typical paths of the scanning laser beam.

Control System (FIGS. 4 and 5)

FIG. 4 is a diagram indicating a construction of the control system 6 in FIG. 3, according to an embodiment of the present invention. In FIG. 4, 113 denotes a CPU, 114 denotes a ROM for storing firmware, 115 denotes a RAM for storing firmware. The CPU 113 carries out an operation for decoding a bar code, controlling the optical system 4 and controlling a communication with the POS terminal equipment through the interface circuit 112. The digital output of the analog to digital converter 107 in FIG. 3, which is denoted by "BAR CODE SIGNAL", is binary, i.e., "1" while the laser beam is spotted on a black bar, and "0" while the laser beam is spotted on a white space. The bar width counter 122 counts, as a bar width, each duration in which the value of the BAR CODE SIGNAL is continuously "0" or "1" using a clock signal of a constant frequency. Thus, successive data respectively indicating widths of bars and spaces scanned with the laser beam are output from the bar width counter 122 corresponding to the respective bars and spaces. The bar width counter 122 also outputs a shift clock signal synchronizing with each of the above data. The data denoted by "BY WIDTH DATA" in FIG. 4, is stored in the buffer memory 124. The above bar width data is also supplied to the bar code detection logic circuit 123 together with the shift clock signal.

The construction comprised of the bar code detection logic circuit 123 and the buffer memories 124 and 125 realizes the functions in the various embodiments of the present invention as explained hereinafter. The basic function of the bar code detection logic circuit 123 is to detect a set of successive bar width data which satisfies a predetermined necessary condition for the set constituting a complete bar code, among bar width data supplied from the bar width counter 122. As explained before, in the hands-free scanners, the scanning of a bar code with the laser beam are carried out successively in a plurality of paths in various directions. FIG. 5 indicates two typical paths of the scanning laser beam. In FIG. 5, in the path A, the laser beam scans all bars and spaces constituting a complete bar code, but in the path B, the laser beam scans only a portion of bars and spaces constituting a complete bar code. Namely, the output of the bar width counter 122 contains bar width data corresponding to a path of the laser beam in which a complete bar code is not scanned. Further, the laser beam may scan a character or a figure which may be printed near the bar code. Thus, only a part of the successive output of the bar width counter 122 corresponds to a scanned result of a complete bar code.

As explained later, when a set of successive bar width data satisfying the necessary condition for a complete bar code is detected by the bar code detection logic circuit 123, the addresses of start and stop codes of the set are memorized or stored in the buffer memory 125.

In addition, the bar code detection logic circuit 123 may be constructed to detect only a predetermined type (kind) of bar code among complete bar codes of various standards. Or the bar code detection logic circuit 123 may be constructed to detect only a set of a plurality of predetermined types (kinds) of bar codes among complete bar codes of various standards. In the latter case, the above addresses are stored in the buffer memory 125 with information on the type of the detected bar code. Alternatively, the addresses may be stored in different areas corresponding to the types of the detected bar codes. Further, the bar code detection logic circuit 123 can discard a set of bar width data which is identical with a set of bar width data already stored in the buffer memory 124 during an operation to read a bar code. Thus, the amount of bar width data stored in the buffer memory 124 is considerably reduced compared with a total amount of the output of the bar width counter 122, so that the decoding of the bar width data stored in the buffer memory 124 can be carried out relatively slowly (compared with the hardware logic circuit) by software. The CPU 113 reads the above bar width data from the buffer memory 124 using the addresses (and information on the type of the bar code), and decodes the bar code in accordance with a decoding program (corresponding to the type of the bar code) stored in the ROM 114 and loaded on the RAM 115.

Figure 6:
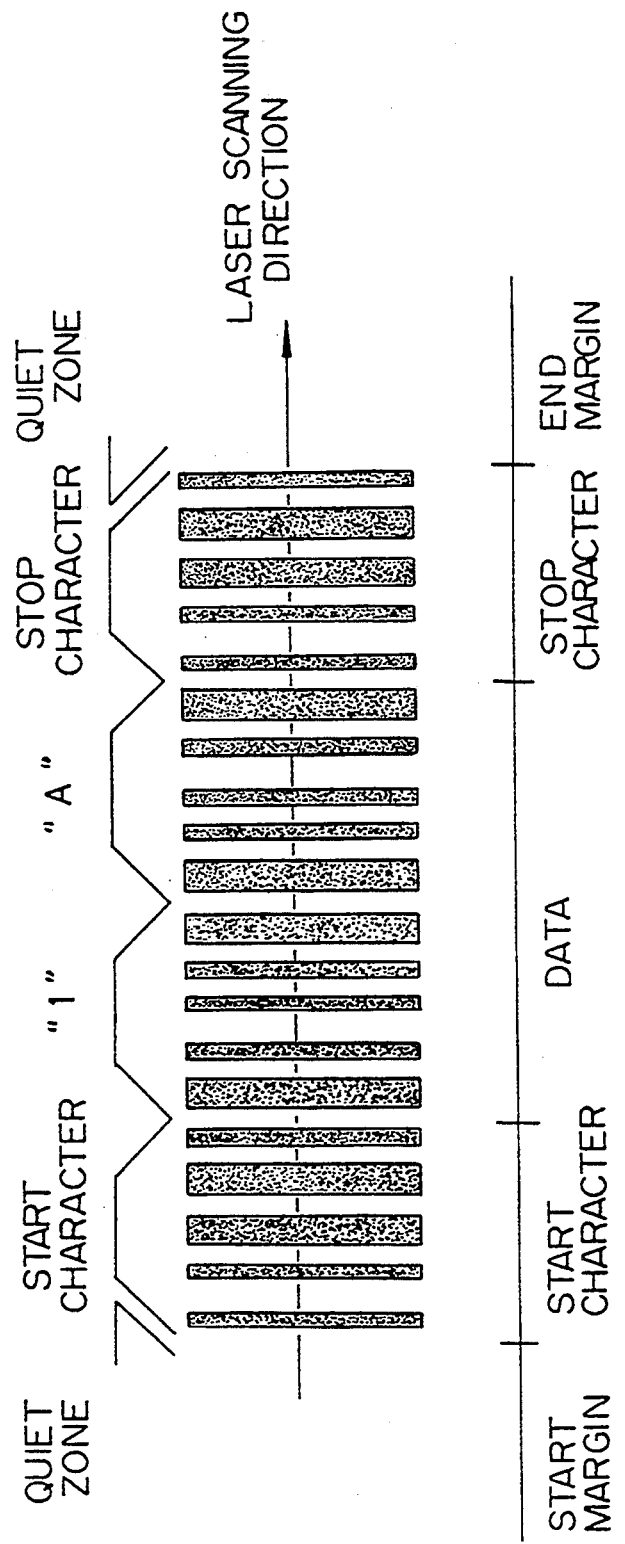
FIG. 6 is a diagram showing a structure of a bar code symbol of CODE39.
Figure 7:
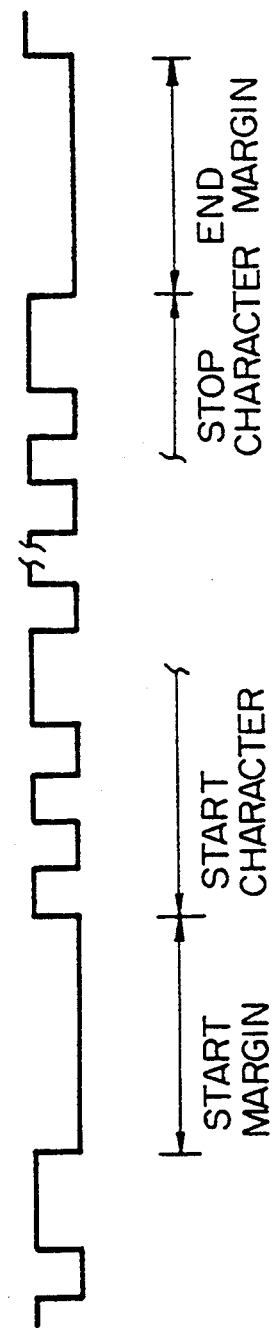
FIG. 7 is a diagram showing an example of the output of the analog to digital converter 107 of FIG. 3.

Structure of Bar Code (FIGS. 6 and 7)

FIG. 6 is a diagram indicating a structure of a bar code symbol of the CODE39 type. As shown in FIG. 6, the bar code symbol contains start and stop characters, a data portion, and start and end margins. When a laser beam scans a bar code symbol in the direction as indicated in FIG. 6, the output of the analog to digital converter 107 of FIG. 3 indicates the levels corresponding to the start margin, the start character, the data portion, the stop character, and the end margin in turn as indicated in FIG. 7. When the laser beam scans the bar code symbol in the opposite direction, the level of the output of the analog to digital converter 107 of FIG. 3 changes corresponding to the end margin, the stop character, the data portion, the start character, and the start margin in turn. Generally, the widths of the start and end margins are about 3.5 to 10 times the widths of the other elements in the start and end characters, and the other characters in the data portions. Therefore, the start and end margins can be detected by monitoring these widths as explained below.

Figure 8:
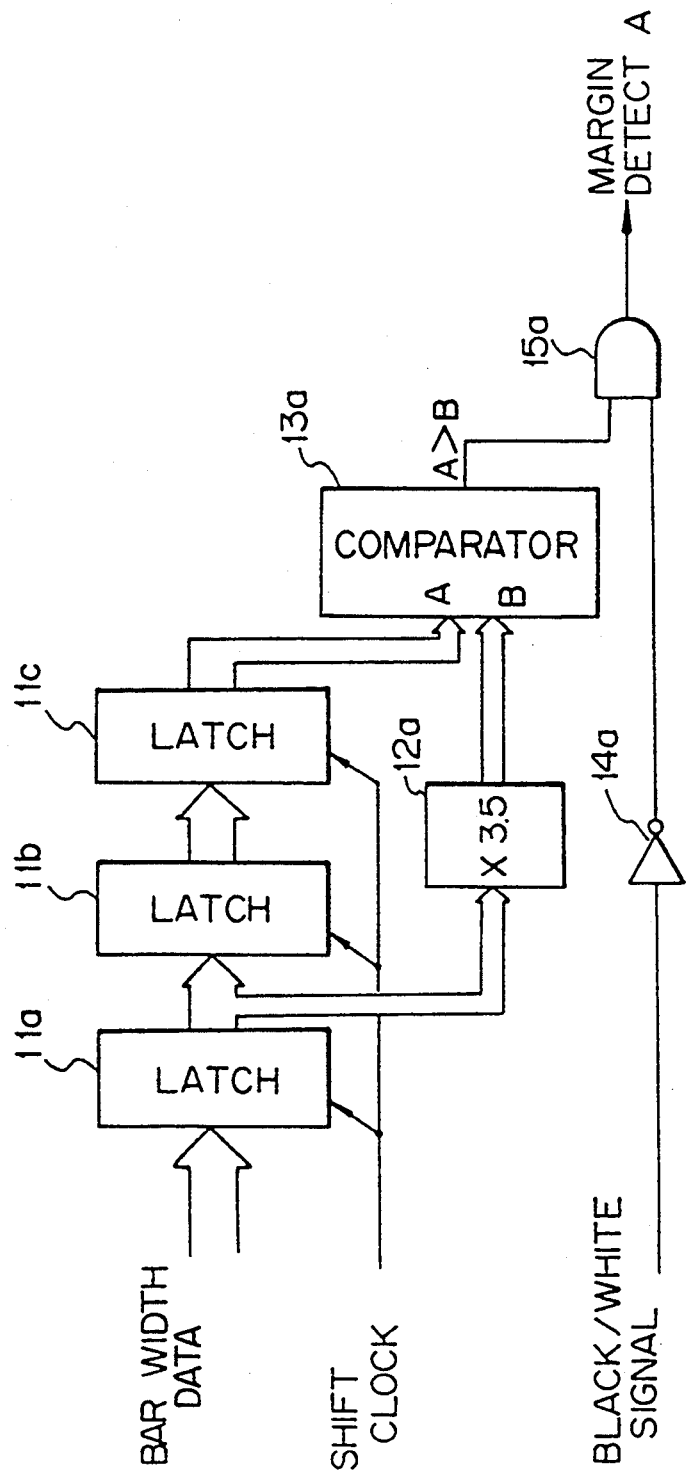
FIG. 8 is a block diagram illustrating a construction of a margin detection circuit.
Figure 9:
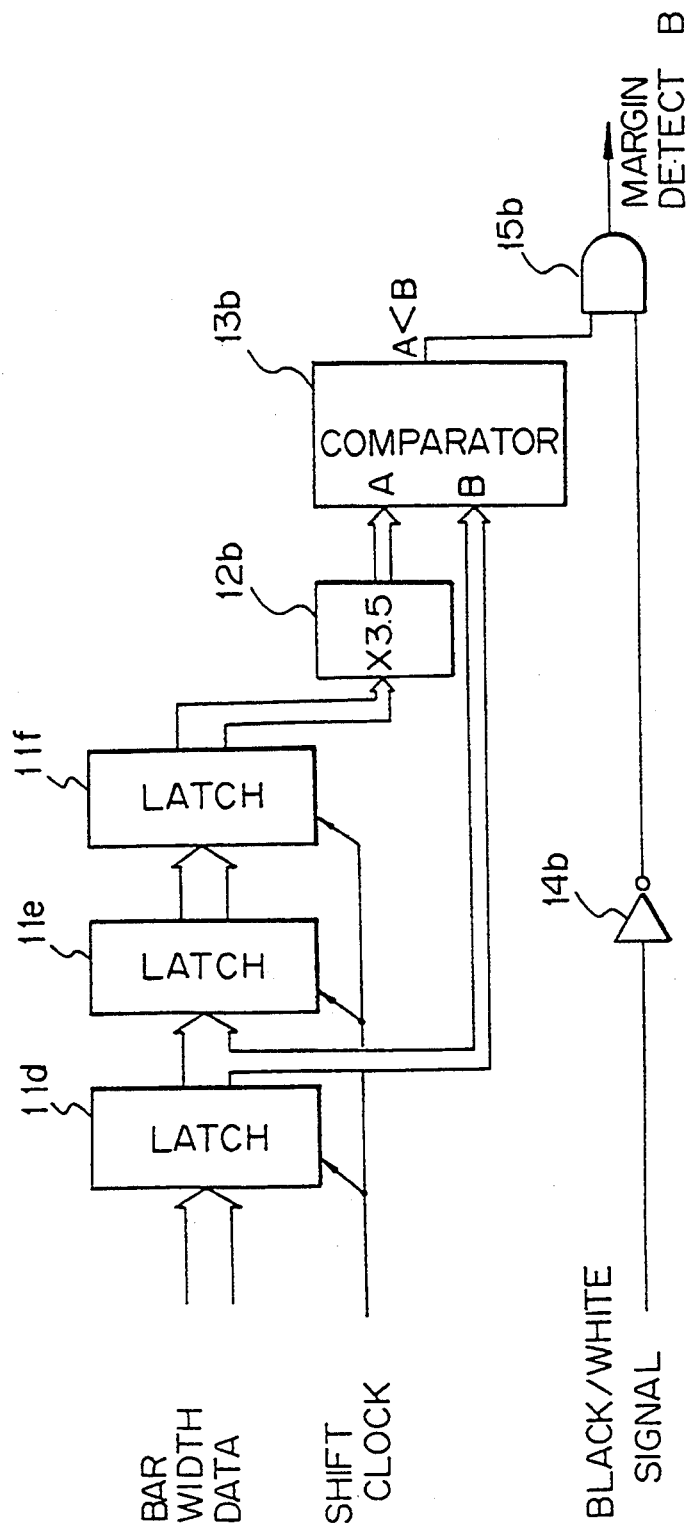
FIG. 9 is a block diagram illustrating a construction of a margin detection circuit.

Margin Detection Circuit (FIGS. 8 and 9)

FIGS. 8 and 9 are block diagrams respectively depicting the construction of margin detection circuits. The circuit of FIG. 8 detects a situation wherein the laser beam scans a margin and then characters, and FIG. 9 detects a situation wherein the laser beam scans characters and then a margin. In FIGS. 8 and 9, reference numerals 11a, 11b, 11c, 11d, 11e, and 11f each denote a register for latching bar width data, 12a and 12b each denote a multiplier for multiplying bar width data by N, 13a and 13b each denote a comparator. Although N=3.5 is used in FIGS. 8 and 9, the values of N may be changed according to the types of the bar code symbols.

In FIG. 8, the shift clock signal is a clock signal synchronizing with the bar width data, and the black/white signal indicates whether or not the element is black or white. The comparator 13a compares {the bar width data latched in the register 11c} with {3.5×(the bar width data latched in the register 11a)}. Since the widths of the start and end margins are more than 3.5 times larger than the width of any element of a character in for the CODE39 type bar code, when width data of a margin is latched in the register 11c, and bar width data of an element in a character is latched in the register 11a, the comparator 13a outputs an active signal. The AND gate 15a and the inverter 14a are provided for confirming that the output of the register 11c corresponds to a white margin. Thus, the output of the AND gate 15a, which is denoted by MARGIN DETECT A, is active when the laser beam scans a margin and then characters.

In FIG. 9, the comparator 13b compares {3.5×(the bar width data latched in the register 11f)} with {the bar width data latched in the register 11d}. Since the widths of the start and end margins are more than 3.5 times larger than the width of any element of a character for CODE39, when width data of a margin is latched in the register 11d, and bar width data of an element in a character is latched in the register 11f, the comparator 13b outputs an active signal. The AND gate 15b and the inverter 14b are provided for confirming that the output of the register 11d corresponds to a white margin. Thus, the output of the AND gate 15b, which is denoted by MARGIN DETECT B, is active when the laser beam scans characters and then a margin.

Figure 10:
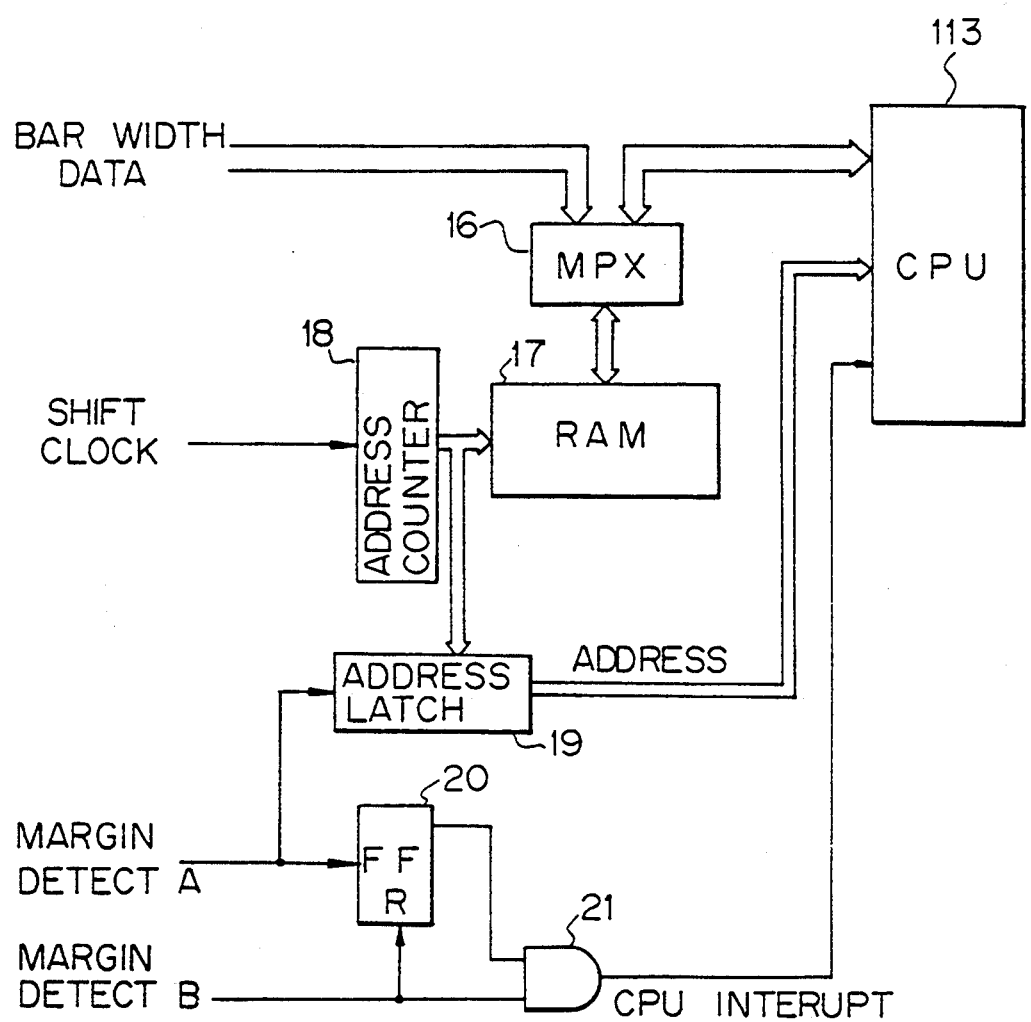
FIG. 10 is a block diagram illustrating a device a for realizing the bar code detection logic circuit 123 and the buffer memories 124 and 125 in FIG. 4 in a first embodiment.
Figure 11:
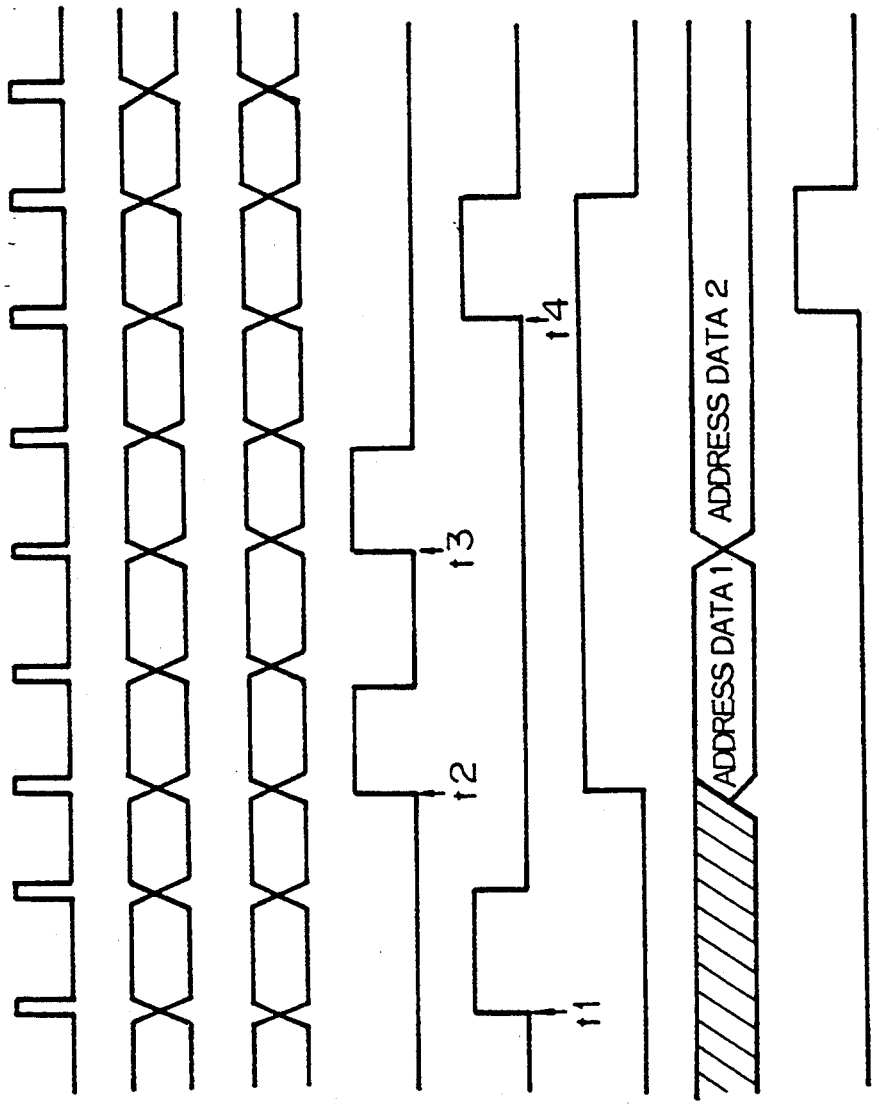
FIG. 11a–11h show a timing chart depicting an example operation of the construction of FIG. 10.

First Embodiment (FIGS. 10 and 11)

FIG. 10 is a block diagram illustrating a device for realizing the bar code detection logic circuit 123 and the buffer memories 124 and 125 in FIG. 4 and is the first embodiment of the present invention. In FIG. 10, reference numeral 16 denotes a multiplexer, 17 denotes a RAM, 18 denotes an address counter, 19 denotes an address latch circuit, 20 denotes a flip flop circuit, and 21 denotes an AND gate. The RAM 17 corresponds to the buffer memory 124 in FIG. 4, and the address latch circuit 19 corresponds to the buffer memory 125 in FIG. 4. The bar width data from the bar width counter 122 of FIG. 4 is applied through the multiplexer 16 to the RAM 17, and an address at which to store the applied bar width data in the RAM 17 is generated in the address counter 18 triggered by the shift clock signal. The address generated by the address counter 18 is also applied to the address latch circuit 19. The output of the address latch circuit 19 is applied to the CPU 113 identical to the CPU 113 in FIG. 4. The MARGIN DETECT A signal from the device of FIG. 8 is applied to the flip flop circuit 20 and the address latch circuit 19. When the MARGIN DETECT A signal becomes active, the address applied to the address latch circuit 19 is latched therein, and the output of the flip flop circuit 20 changes to a high level. The output of the flip flop circuit 20 is applied to one input terminal of the AND gate 21, and the MARGIN DETECT B signal from the device of FIG. 9 is applied to the other input terminal of the AND gate 21. Thus, when the MARGIN DETECT A signal becomes active, and then the MARGIN DETECT B signal becomes active, i.e., the laser beam scans a margin, then characters, and again a margin, and the output of the AND gate 21 becomes active. The active output of the AND gate 21 is supplied to the CPU 113 as a CPU interrupt signal.

FIG. 11 indicates the operation of the device of FIG. 10. As shown in FIG. 11, bar width data and the shift clock signal are supplied to the device of FIG. 10, and the address for storing the bar width data in the RAM 17 is generated synchronizing with the shift clock. When the MARGIN DETECT B signal becomes active at the time t1, the flip flop circuit 20 is reset. Then, the MARGIN DETECT A signal becomes active at the time t2, the flip flop circuit 20 is set, and the output of the address counter 18 is latched in the address latch circuit 19. At the time t3, the MARGIN DETECT A signal becomes active again, and thereby a new output of the address counter 18 is latched in the address latch circuit 19. Then, the MARGIN DETECT B signal becomes active at the time t4, and thereby the output of the AND gate 21 becomes active to supply a CPU interrupt signal to the CPU 113.

When the CPU 113 receives the CPU interrupt signal, the CPU 113 reads a set of successive bar width data probably corresponding to a bar code, which is stored in the RAM 17 in the addresses beginning with the address output from the address latch circuit 19, through the multiplexer 16, and decodes the bar code in accordance with a bar code decoding program. The device of FIG. 10 cannot necessarily select a set of successive bar width data corresponding to a bar code only. However, the detection of the MARGIN DETECT A signal followed by the detection of the MARGIN DETECT B signal is a necessary condition for detecting a complete bar code, and therefore, a lot of imperfect data supplied from the bar width counter 122 of FIG. 4 can be screened out by the device of FIG. 10.

Decoding of Bar Code (FIG. 12)

FIG. 12 indicates examples of the CODE39 characters. In FIG. 12, the bar codes for the characters "1" and "M" are shown. In CODE39, each character is represented by five black and four white elements, and each thick element represents "1" and each thin element represents "0". To determine whether each element is thick or thin, an average width of the nine elements may be used as a threshold value. Thus, a pattern comprised of "1" and "0" is obtained, and the pattern is compared with a table of patterns to determine the character the pattern represents. When the CPU 113 carries out the above operation for all character patterns in a bar code, the decoding operation is completed. The program for carrying out the above operation is stored in the ROM 114 in FIG. 4. Although the outline of the decoding operation of the CODE39 bar code only is explained above, decoding can be carried out for any other type of bar code in accordance with respectively well known procedures.

When the decoding operation is completed, the bar code reader of FIG. 3 informs the operator of the completion of the decoding operation by using the LED 108 or the speaker 109 of FIG. 3, and the decoded data is transferred through the interface circuit 112 to the POS terminal equipment.

Figure 13:
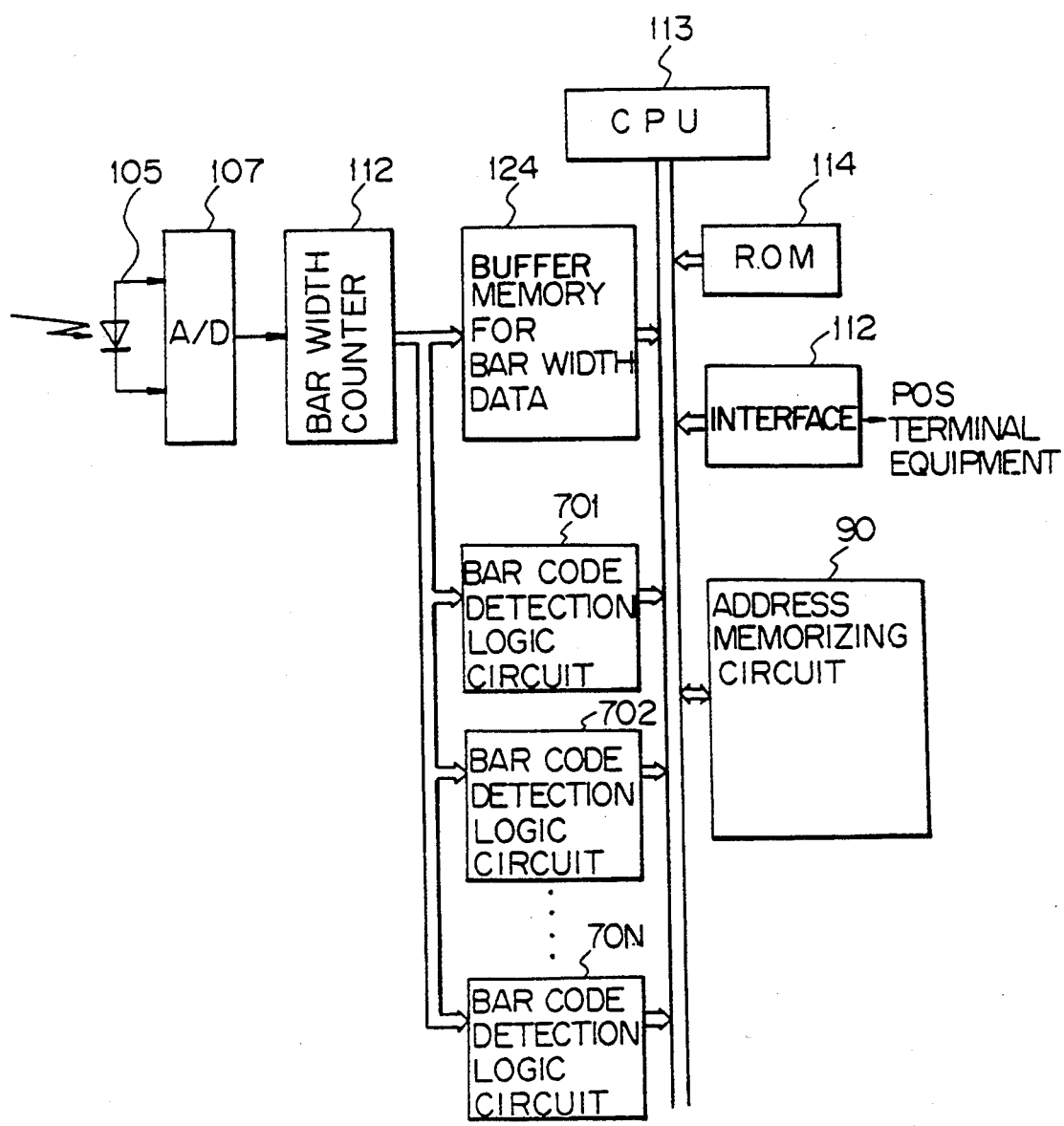
FIG. 13 is a block diagram illustrating a construction of a device for realizing the bar code detection logic circuit 123 and the buffer memories 124 and 125 in FIG. 4 in a second embodiment.
Figure 14:
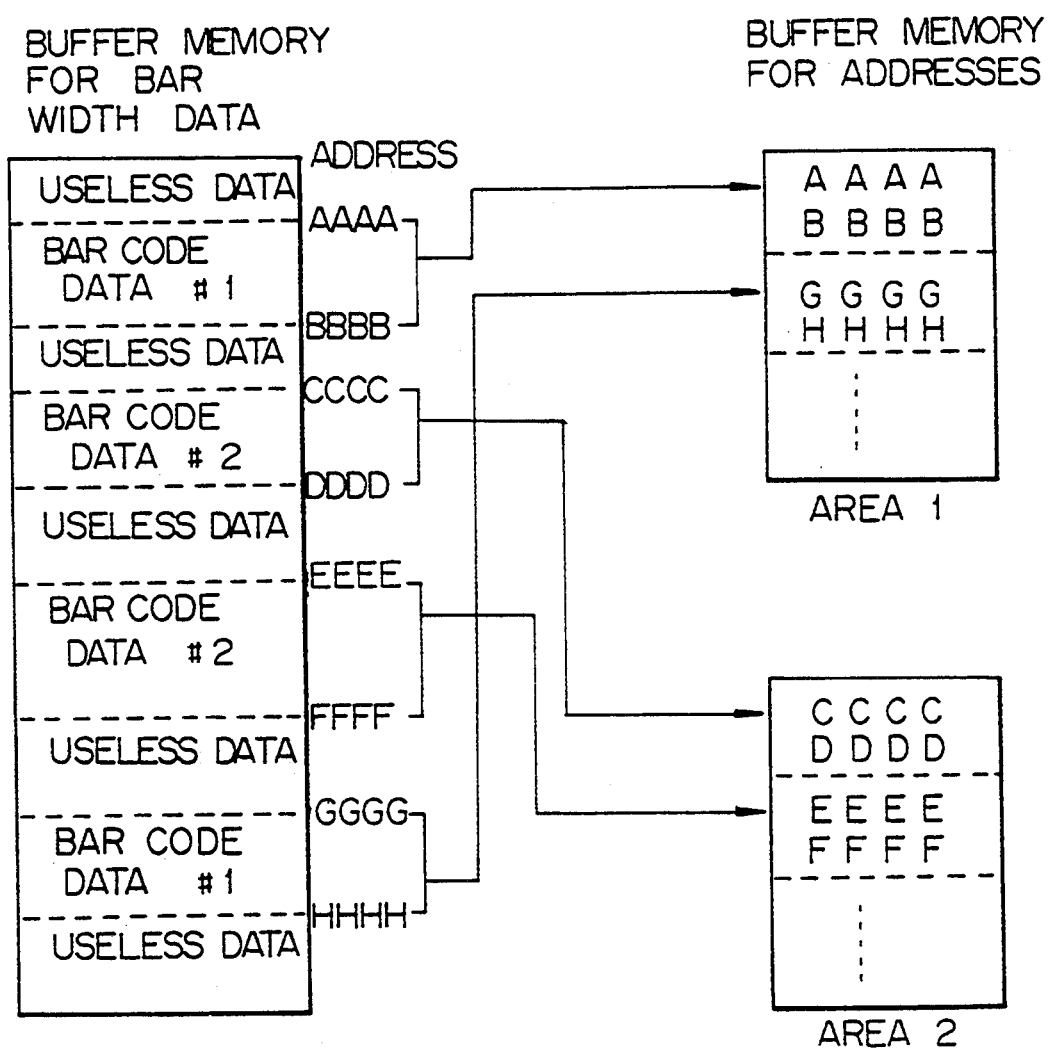
FIG. 14 is a diagram for depicting the address information for bar codes of different types in different areas of the buffer memory in the address memorizing circuit 90.

Second Embodiment (FIGS. 13 and 14)

FIG. 13 is a block diagram illustrating a device for realizing the bar code detection logic circuit 123 and the buffer memories 124 and 125 in FIG. 4 in a second embodiment. In FIG. 13, reference numerals 701 to 70N each denote a bar code detection logic circuit, 90 denotes an address memorizing circuit, and all the other elements denoted by the same reference numerals as shown in the other figures respectively indicate the same elements. The bar code detection logic circuits 701 to 70N realizes or implements the bar code detection logic circuit 123 in FIG. 4, and the address memorizing circuit 90 comprises a buffer memory corresponding to the buffer memory 125 in FIG. 4 and an address latch circuit similar to the address latch circuit 19 of FIG. 10. Each of the bar code detection logic circuits 701 to 70N corresponds to a specific type of bar code, and determines whether or not bar width data successively output from the bar width counter 122 satisfies a predetermined necessary condition for a bar code of the type corresponding to the bar code detection logic circuit. Each of the bar code detection logic circuits 701 to 70N comprises the margin detection circuits of FIGS. 8 and 9 for the corresponding type of bar code, the device comprised of the flip flop circuit 20 and the AND gate 21 of FIG. 10, and another device for determining the satisfaction of the above predetermined necessary condition. When the output of the AND gate 21 becomes active, and the above predetermined necessary condition is determined to be satisfied, the bar code detection logic circuit outputs an active signal. The output of each of the bar code detection logic circuits 701 to 70N becomes active when the bar code detection logic circuit detects a bar code of the type corresponding to the circuit, and the outputs of the bar code detection logic circuits 701 to 70N are supplied to the address memorizing circuit 90. Although not shown, the output of the above address counter 18 is applied to the above address latch circuit 19, and the output of the address latch circuit 19 is stored in the above buffer memory in the address memorizing circuit 90, together with the above outputs of the bar code detection logic circuits 701 to 70N. Thus, the buffer memory in the address memorizing circuit 90 stores information on the type of the detected bar code, and the top or highest address of an area in which the bar width data of the bar code is stored in the buffer memory 124 (RAM 17). Instead of storing the above information on the type together with the address, different areas may be allocated to the respective types of bar code as indicated in FIG. 14. In FIG. 14, the addresses for storing the bar width data of bar codes of type #1 are stored in the area 1 of the buffer memory in the address memorizing circuit 90, and the addresses for storing the bar width data of bar codes of type #2 are stored in the area 2 of the buffer memory in the address memorizing circuit 90. In this case, although not shown, the outputs of the bar code detection logic circuits 701 to 70N may be used as a part (bits) of an address of the buffer memory in the address memorizing circuit 90 for storing the above address from the address latch circuit 19, and the other bits of the address of the buffer memory in the address memorizing circuit 90 can be generated by an address counter (not shown) provided corresponding to each of the bar code detection logic circuits 701 to 70N, and the address of the address counter 18 is incremented by the active output of the corresponding bar code detection logic circuit.

The ROM 114 stores decoding programs for all the types of bar codes corresponding to the above bar code detection logic circuits 701 to 70N, and the CPU 113 reads the above content of the address memorizing circuit 90, reads the bar width data stored in the buffer memory 124 using the address stored in the address memorizing circuit 90, and decodes the bar width data using the decoding program for the type which is stored in the address memorizing circuit 90 together with the above address.

Although in the above explanation, the details of the operations for determining the satisfaction of the predetermined necessary condition by the bar code detection logic circuits 701 to 70N are not indicated, the necessary condition and the operations for the determination will be understood from the explanations of the fifth and the following embodiments.

Figure 15:
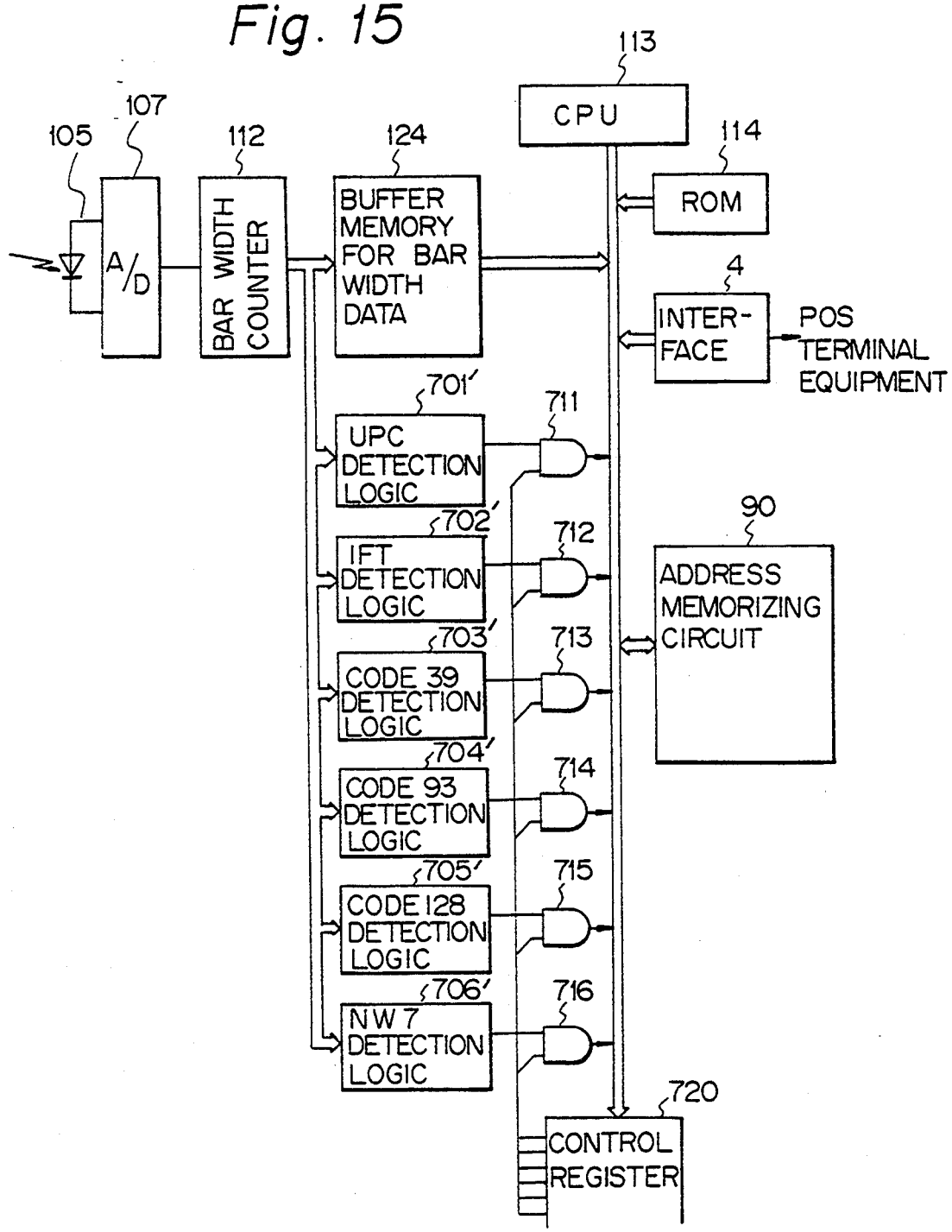
FIG. 15 is a block diagram indicating a way of realizing the bar code detection logic circuit 123 and the buffer memories 124 and 125 in FIG. 4 in a third embodiment.

Third Embodiment (FIG. 15)

FIG. 15 is a block diagram illustrating a device for realizing the bar code detection logic circuit 123 and the buffer memories 124 and 125 in FIG. 4 in the third embodiment. In FIG. 15, reference numerals 701' to 706' each denote a bar code detection logic circuit, 711 to 716 each denote an AND gate, 720 denotes a control gate, 90' denotes an address memorizing circuit, and all the other elements denoted by the same reference numerals as shown in the other figures respectively indicate the same elements. The bar code detection logic circuits 701' to 706' correspond to the bar code detection logic circuits 701 to 70N in the construction of FIG. 13. In the construction of FIG. 15, the bar code detection logic circuit 701' detects a bar code of UPC (Universal Product Code), the bar code detection logic circuit 702' detects a bar code of ITF (Interleaved 2 out of 5), the bar code detection logic circuit 703' detects a bar code of CODE39, the bar code detection logic circuit 704' detects a bar code of CODE93, the bar code detection logic circuit 705' detects a bar code of CODE128, and the bar code detection logic circuit 706 detects a bar code of NW7 (Narrow Wide 7). The control register 720 and the AND gates 711 to 716 constitute a selector to pass an active output from only one of the bar code detection logic circuits 701' to 706'. The selection mode is preset in the control register 720 by the CPU 113. It is known that an incomplete scan result of a bar code of a type may accord with a complete scan result of another bar code of another type to cause an error. Therefore, such an erroneous detection may be prevented by the provision of the above selector. The address memorizing circuit 90' operates in the same way as the corresponding circuit 90 in FIG. 13.

Figure 16:
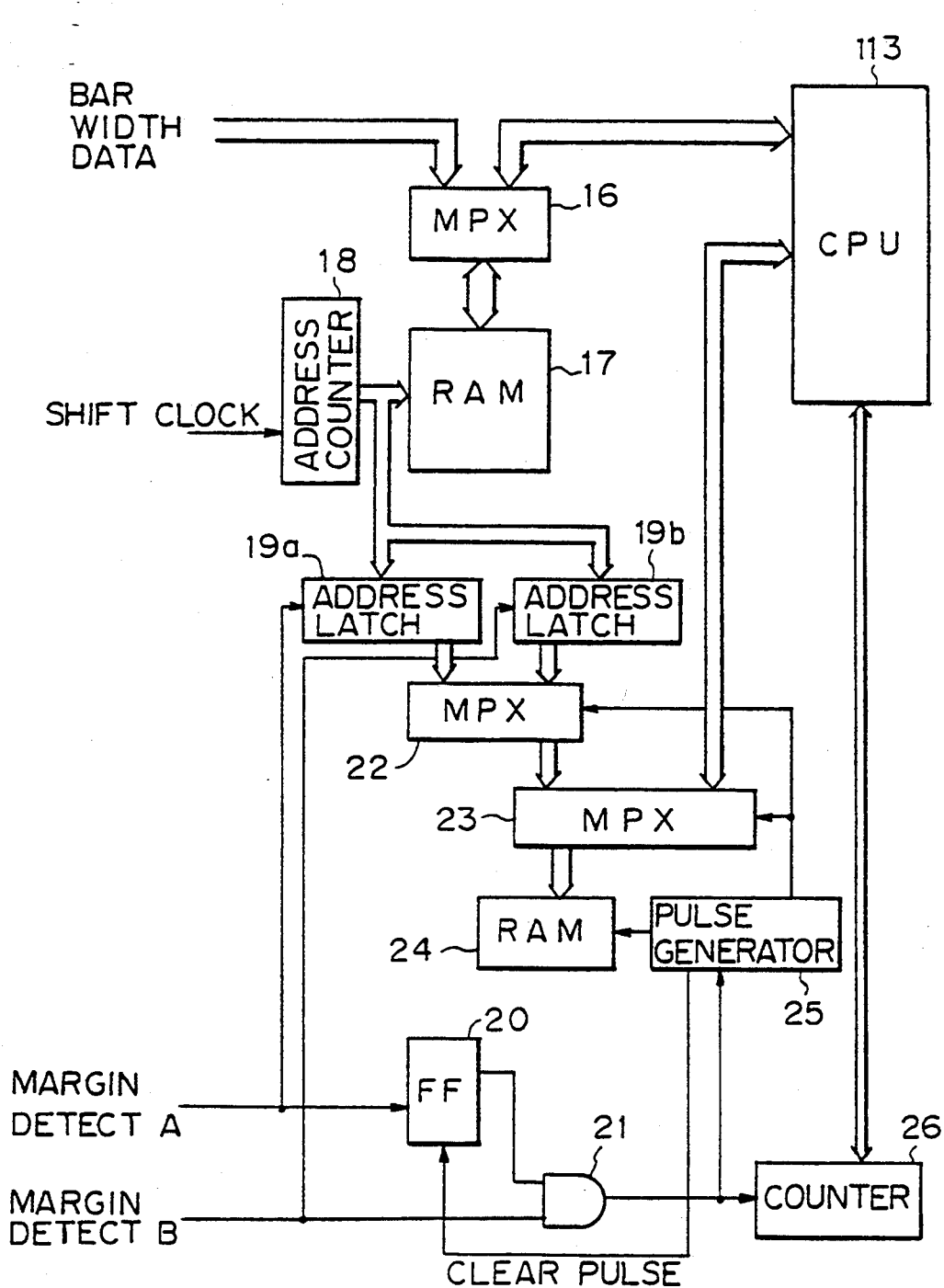
FIG. 16 is a block diagram depicting a way of realizing the bar code detection logic circuit 123 and the buffer memories 124 and 125 in FIG. 4 in a fourth embodiment.

Fourth Embodiment (FIG. 16)

FIG. 16 is a block diagram illustrating a device construction for realizing the bar code detection logic circuit 123 and the buffer memories 124 and 125 and the buffer memories 124 and 125 in FIG. 4 in the fourth embodiment. In FIG. 16, reference numeral 19a and 19b each denote an address latch circuit, 22 and 23 each denote a multiplexer, 24 denotes a RAM, 25 denotes a pulse generator, 26 denotes a counter, and all the other elements denoted by the same reference numerals as shown in the other figures respectively indicate the same elements. The address output from the address counter 18 is applied to both the address latch circuits 19a and 19b, the MARGIN DETECT A signal is applied to the address latch circuit 19a to control the timing of latching the address applied thereto, and the MARGIN DETECT B signal is applied to the address latch circuit 19b to control the timing of latching the address applied thereto. Thus, the top address of the bar width data of each bar code stored in the RAM 17 is latched in the address latch circuit 19a, and the end address of the bar width data of each bar code stored in the RAM 17 is latched in the address latch circuit 19b. As explained with reference to FIG. 10, when the laser beam scans a margin, then characters, and again a margin, the output of the AND gate 21 becomes active. The output of the AND gate 21 is applied to the counter 26 to increment a count of the counter 26 which indicates the number of bar codes stored in the RAM 17 to be decoded by the CPU 113. The output of the AND gate 21 is also applied to the pulse generator 25. When the pulse generator 25 receives the active output of the AND gate 21, the pulse generator 25 controls the multiplexer 23 to select the output of the multiplexer 22, controls the multiplexer 22 to select the outputs of the address latch circuits 19a and 19b in turn, and enables the RAM 24 to write the output of the multiplexer 23 therein. Thus, when the output of the AND gate 21 becomes active, the top and end addresses of the bar width data of each bar code are stored in the RAM 24.

The CPU 113 monitors the count of the counter 26. When the count is more than a predetermined number, the CPU 113 reads the top and end addresses from the RAM 24 through the multiplexer 23, reads the bar width data stored from the top address to the end address of the RAM 17 through the multiplexer 16, and decodes the bar code constituted by the bar width data.

Figure 17:
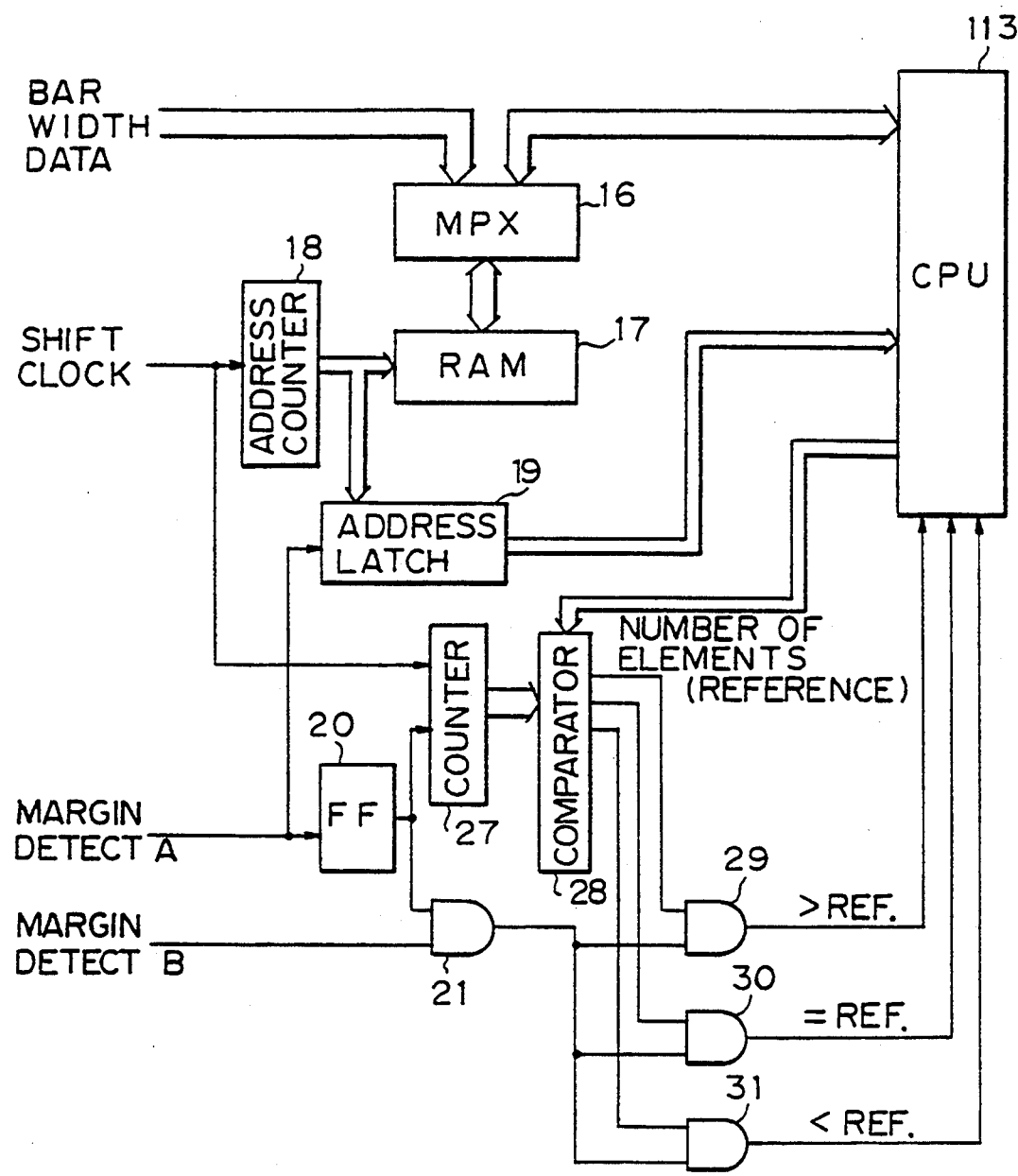
FIG. 17 is a block diagram illustrating a device for realizing the bar code detection logic circuit 123 and the buffer memories 124 and 125 in FIG. 4 in a fifth embodiment.

Fifth Embodiment (FIG. 17)

FIG. 17 is a block diagram depicting a device for realizing the bar code detection logic circuit 123 and the buffer memories 124 and 125 in FIG. 4 in the fifth embodiment. In FIG. 17, reference numeral 27 denote a counter, 28 denotes a comparator, 29 to 31 each denote an AND gate, and all the other elements denoted by the same reference numerals as shown in FIG. 10 respectively indicate the same elements. The counter 27 is incremented when each shift clock signal is applied thereto while the output of the flip flop circuit 20 becomes active. The CPU 113 presets a reference value which is equal to the number of elements in a bar code of a specific type, in the comparator 28. The comparator 28 compares the count of the counter 27 with the reference value, and makes one of its three outputs active according to whether the count is larger than the reference value, the count is equal to the reference value, or the count is smaller than the reference value. The three outputs of the comparator 28 are respectively applied to one of the input terminals of the AND gates 29 to 31. These AND gates receive the output of the AND gate 21 at the other input terminal thereof. Thus, when a scan of a bar code is completed, i.e., the output of the AND gate 21 becomes active, the count of the counter 27 indicates the number of elements existing between the margins of the both sides of the bar code, and the three outputs of the comparator 28, or the outputs of the AND gates 29 to 31 indicate whether the count is larger than the reference value, the count is equal to the reference value, or the count is smaller than the reference value. These outputs are supplied to the CPU 113, and thus, the CPU 113 can receive the information on the number of the elements in the bar code.

The number of elements in each UPC bar code is constant, and ITF codes are generally used with a constant number of elements in each bar code. In addition, the minimum number of elements in each bar code is set forth in the standards of CODE39, CODE93, CODE128, and Codabar (equivalent to NW7), as indicated in Table 1. Therefore, the examination of the number the elements in each bar code can be used as the aforementioned necessary condition, the satisfaction of which is to be determined in the aforementioned bar code detection logic circuits in the devices of FIGS. 13 and 15, and the devices of FIG. 17 is useful for the above determination.

Further, there is a maximum number of elements in a bar code which can be read by a bar code reader because of a physical limit specific to each bar code reader. Therefore, the construction of FIG. 16 may be used for the detection of the excess of the number of elements over the maximum number to prevent such data from being supplied to the CPU 113.

TABLE 1

MINIMUM NUMBERS OF ELEMENTS IN BAR CODES IN BAR CODE SYMBOLS

| TYPE OF BAR CODE | MINIMUM NUMBER OF ELEMENTS |
| --- | --- |
| CODE39 | 29 |
| CODE93 | 31 |
| CODE128 | 25 |
| Codabar (NW7) | 23 |

Figure 18:
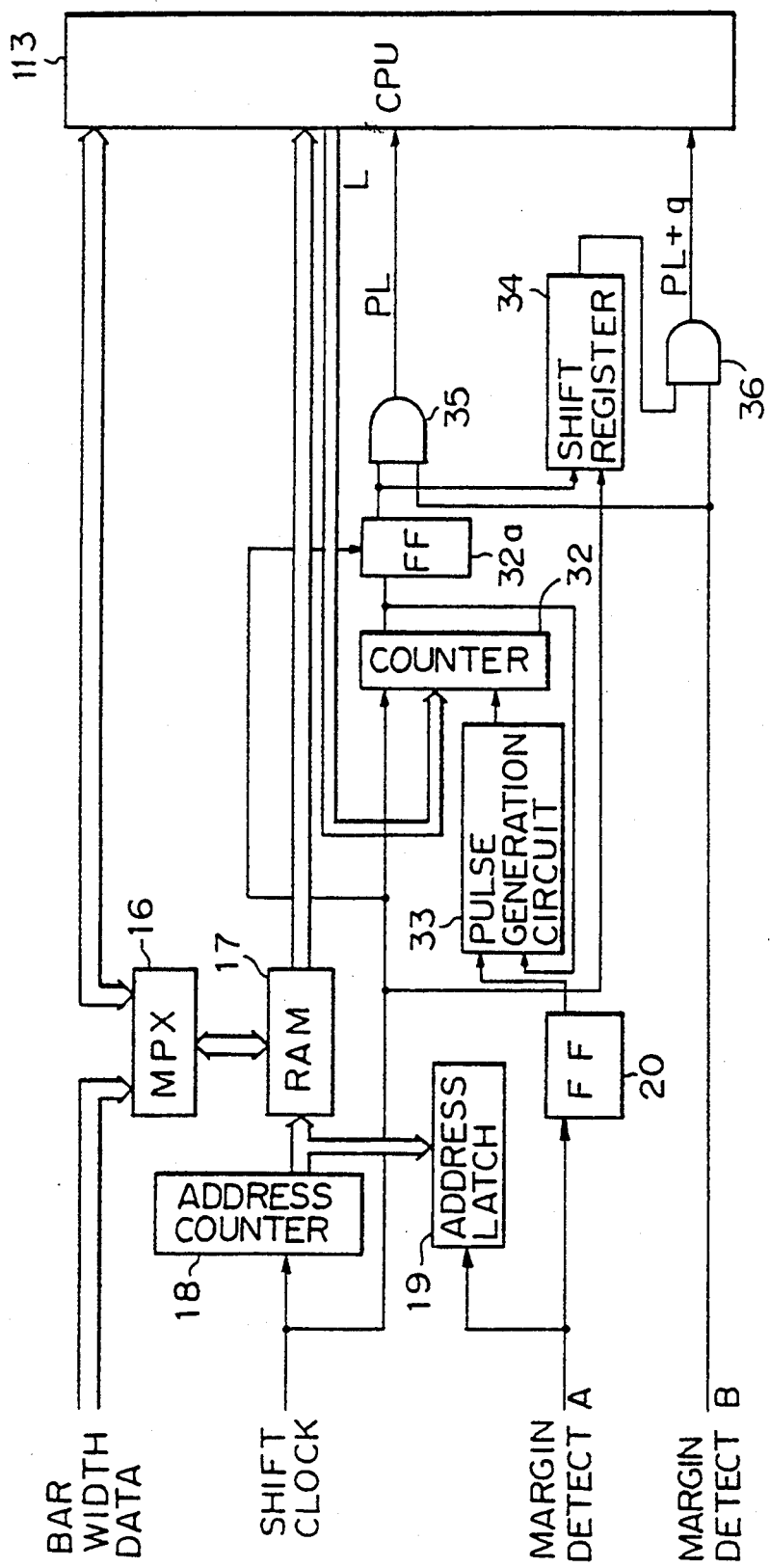
FIG. 18 is a block diagram of a device realizing the bar code detection logic circuit 123 and the buffer memories 124 and 125 in FIG. 4 in a sixth embodiment.

Sixth Embodiment (FIG. 18)

FIG. 18 is a block diagram illustrating a device for realizing the bar code detection logic circuit 123 and the buffer memories 124 and 125 in FIG. 4 in the sixth embodiment. The device of FIG. 18 is provided to detect a bar code in which the number of elements between the margins is equal to $L \times p$, or $L \times p + q$ where L, p, and q are each a predetermined integer. In FIG. 18, reference numeral 32 denotes a counter, 32a denotes a flip flop circuit, 33 denotes a pulse generation circuit, 34 denotes a shift register, 35 and 36 each denote an AND gate, and all the other elements denoted by the same reference numerals as shown in FIG. 10 respectively indicate the same elements.

The CPU 113 applies a preset value L (which is explained below) to the counter 32, and the counter 32 sets the preset value therein when an active signal is output from the pulse generation circuit 33 thereto. The pulse generation circuit 33 outputs the active signal when the output of the flip flop circuit 20 rises, or when the count of the counter 32 reaches zero to output a carry output. The count of the counter 32 is decremented when an shift clock signal is applied thereto. The flip flop circuit 32a is set when the counter 32 outputs a carry output, and is reset when a next shift clock signal is applied thereto. The output of the flip flop circuit 32a is applied to one of the input terminals of the AND gate 35, and to a serial data input terminal of the shift register 34. The AND gate 35 receives the MARGIN DETECT B signal at the other input terminal by thereof. Gate 35 performs coincidence detection between the flip-flop output and the MARGIN DETECT B signal. The serial data output of the shift register 34 is applied to one of the input terminals of the AND gate 36, and the MARGIN DETECT B signal is applied to the other input terminal of the AND gate 36. Gate 36 performs coincidence detection between the output of the shift register and the MARGIN DETECT B signal.

Thus, When the MARGIN DETECT A signal sets the flip flop circuit 20, the active output of the flip flop circuit 20 triggers the pulse generation circuit 33 to preset the counter 32. Then, when L shift clocks are counted by the counter 32, the counter 32 outputs a carry output to set the flip flop circuit 32a, and trigger the pulse generator 33. The flip flop circuit 32a is immediately reset by the next shift clock, and the same operation is repeated until the MARGIN DETECT B signal is input to the construction of FIG. 18. If, the timing at which the active MARGIN DETECT B signal is applied to the AND gate 35, coincides with the timing at which the output of the flip flop circuit 32a is active, the output of AND gate 35 becomes active, and the active output is sensed by the CPU 113. Namely, the CPU 113 recognizes that the number of elements in the bar code is equal to $L \times p$.

The shift register 34 contains q stages, and the contents of these stages are shifted by one stage when a shift clock is applied to the shift register 34. That is, an active output from the flip flop circuit 32a is output from the serial output terminal of the shift register 34 q shift clock cycles after an active signal is input into the serial input terminal thereof. Since the output of the flip flop circuit 32a becomes active $L \times p$ shift clock cycles after the first element of the bar code, the serial output of the shift register 34 becomes active $L \times p + q$ shift clock cycles after the first element of the bar code. If, the timing at which the MARGIN DETECT B signal is applied to the AND gate 36, coincides with the timing at which the output of the shift register 34 is active, the output of AND gate 36 becomes active, and the active output is sensed by the CPU 113. Namely, the CPU 113 recognizes that the number of elements in the bar code is equal to $L \times p + q$.

Table 2 shows the above preset value L to be used for various types of bar codes. Since the number of elements in each character in the CODE39 bar codes is nine, and one space called an inter-character gap space is inserted between adjacent characters in the CODE39 bar codes, the preset value L is set as ten for the CODE39 bar codes. Similarly, since the number of elements in each character in the Codabar (NW7) bar codes is seven, and one inter-character gap is inserted between adjacent characters in the Codabar (NW7) bar codes, the preset value L is set as eight for the Codabar (NW7) bar codes. Since the number of elements in each character in the CODE93 and CODE128 bar codes is six, and no inter-character gap is inserted between any characters in the CODE93 and CODE128 bar codes, the preset value L is set as six for the CODE93 and CODE128 bar codes. However, the number of elements in the stop character in the CODE93 and CODE128 bar codes is seven, and therefore the number q of stages in the shift register 34, is set to one for the CODE93 and CODE128 bar codes.

TABLE 2

COUNTER PRESET VALUES L FOR VARIOUS TYPES OF BAR CODES

| TYPE OF BAR CODE | COUNTER PRESET VALUES L |
| --- | --- |
| CODE39 | 10 |
| CODE93 | 6 |
| CODE128 | 6 |

TABLE 2-continued

| COUNTER PRESET VALUES L FOR VARIOUS TYPES OF BAR CODES | |
|---|---|
| TYPE OF BAR CODE | COUNTER PRESET VALUES L |
| Codabar (NW7) | 8 |

Figure 19:
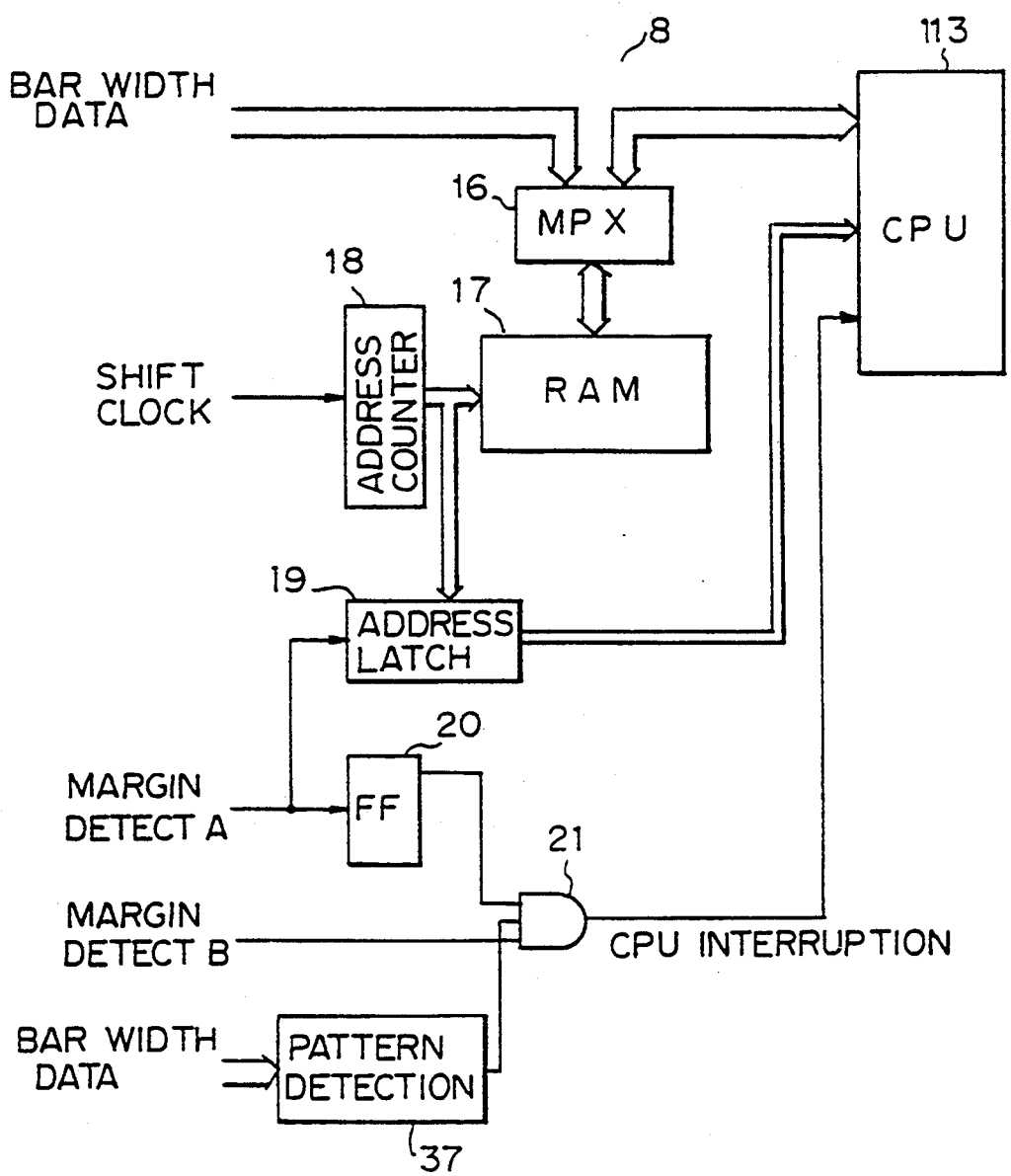
FIG. 19 is a block diagram of a the bar code detection logic circuit 123 and the buffer memories 124 and 125 in FIG. 4 in a seventh embodiment.
Figure 20:
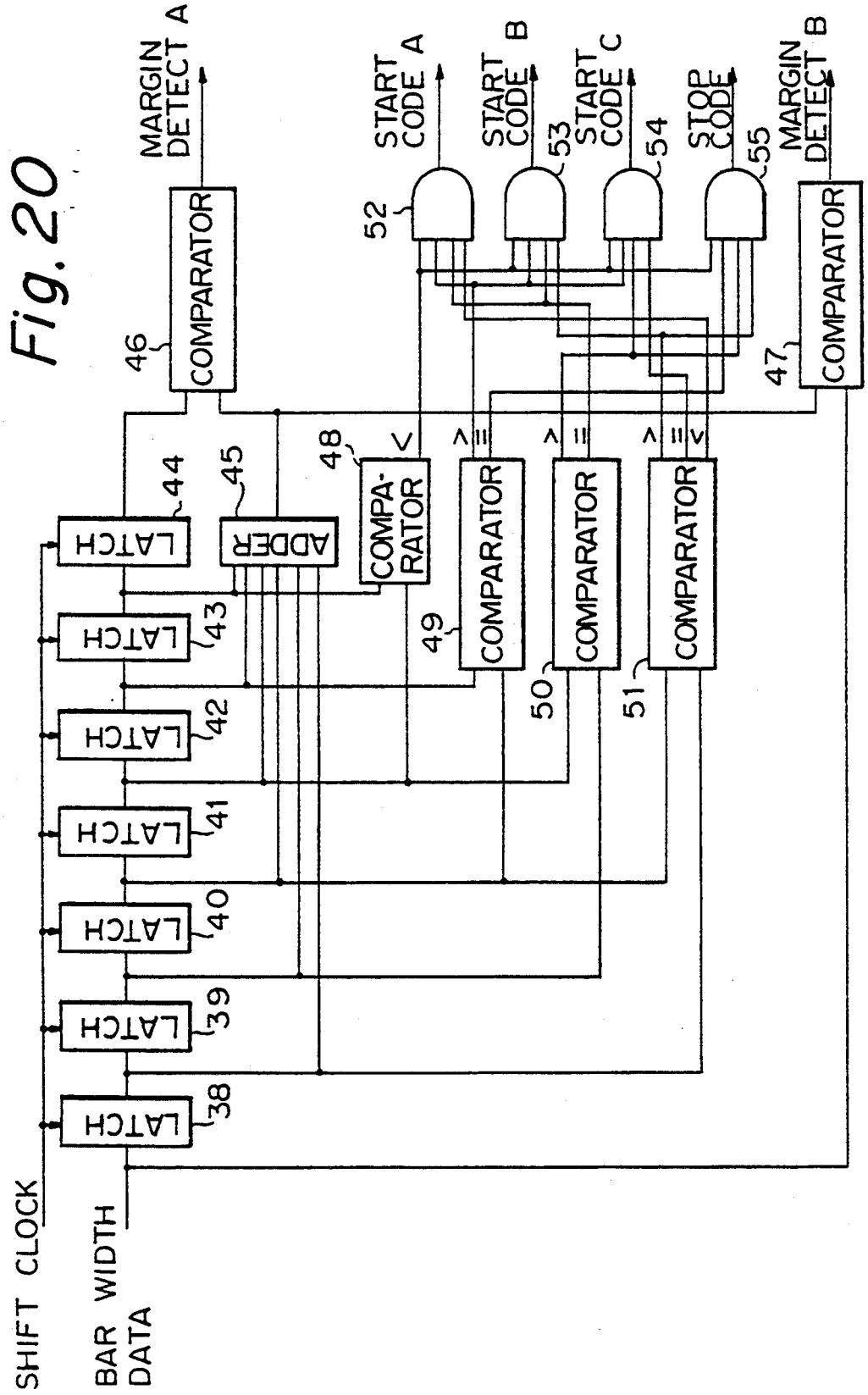
FIG. 20 is a diagram showing the construction of the pattern detection circuit 37 in FIG. 19 according to the seventh embodiment.

Seventh Embodiment (FIGS. 19 and 20)

FIG. 19 is a block diagram illustrating a device for realizing the bar code detection logic circuit 123 and the buffer memories 124 and 125 in FIG. 4 in the seventh embodiment. In the device of FIG. 19, a pattern detection circuit 37 is added to the device of FIG. 10. The construction of the pattern detection circuit 37 in FIG. 19 according to the seventh embodiment is illustrated in FIG. 20. The device of FIG. 20 is provided to detect any of the three start codes A, B, and C, and the stop code of CODE128 in addition to the margin detect A signal and the margin detect B signal. In FIG. 20, reference numerals 38 to 44 each denote a latch circuit, 45 denotes an adder, 46 to 51 each denote a comparator, and 52 to 55 each denote an AND gate.

The successive bar width data generated in the bar width counter 122 is supplied to the latch circuit 38, and latched therein synchronizing with the shift clock signal. Then, the latched bar width data is shifted through the series of latch circuits 38 to 44 one by one synchronizing with the shift clock signal. Namely, seven bar width data successively output from the bar width counter 122 are latched in the latch circuits 38 to 44. The adder 45 obtains a sum of the bar widths output from the six latch circuits 38 to 43. The number six is determined based on the number of elements in each character of CODE128. Thus, when a bar width of a margin followed by a character is latched in the latch circuit 44, the output of the adder 45 indicates a length of a character following the margin, and the comparator 46, which compares the output of the latch circuit 44 with the output of the adder 45, outputs an active margin detect A signal. When the content of the latch circuit 44 is not the margin followed by a character, the output of the comparator 46 is not active. The detail of the comparator 46 is explained later with reference to FIG. 22. Similarly, when a bar width of a margin following a character is applied to an input side of the latch circuit 38 as a currently newest bar width data, the output of the adder 45 indicates the length of a character preceding the margin, and the comparator 47, which compares the currently newest bar width data with the output of the adder 45, outputs an active margin detect B signal. When the currently newest bar width data is not the margin following a character, the output of the comparator 47 is not active. The detail of the comparator 47 is explained later with reference to FIG. 22.

The comparator 48 compares the output of the latch circuit 43 with the output of the latch circuit 41, and outputs a 48< signal which indicates whether or not the output of the latch circuit 41 is smaller than the output of the latch circuit 43. The comparator 49 compares the output of the latch circuit 42 with the output of the latch circuit 40, and outputs a 49> signal which indicates whether or not the output of the latch circuit 40 is larger than the output of the latch circuit 42, and a 49= signal, which indicates whether or not the two compared bar widths are equal. The comparator 50 compares the output of the latch circuit 41 with the output of the latch circuit 39, and outputs a 50> signal, which indicates whether or not the output of the latch circuit 39 is larger than the output of the latch circuit 41, and a 50= signal, which indicates whether or not the two compared bar widths are equal. The comparator 51 compares the output of the latch circuit 40 with the output of the latch circuit 38, and outputs a 51> signal, which indicates whether or not the output of the latch circuit 38 is larger than the output of the latch circuit 40, a 51=0 signal, which indicates whether or not the two compared bar widths are equal, and a 51< signal, which indicates whether or not the output of the latch circuit 38 is smaller than the output of the latch circuit 40. The detail of the comparators 48 to 51 are explained later with reference to FIG. 23. The AND gate 52 receives the above 48<, 49>, 50=, and 51< signals at four input terminals thereof, and outputs an active START CODE A signal when all the above input signals are active. The active START CODE A signal indicates that the START CODE A of CODE128 is detected. The AND gate 53 receives the above 48<, 49>, 50>, and 51= signals at four input terminals thereof, and outputs an active START CODE B signal when all the above input signals are active. The active START CODE B signal indicates that the START CODE B of CODE128 is detected. The AND gate 54 receives the above 48<, 49>, 50>, and 51= signals at four input terminals thereof, and outputs an active START CODE C signal when all the above input signals are active. The active START CODE C signal indicates that the START CODE C of CODE128 is detected. The AND gate 55 receives the above 48<, 49=, 50>, and 51> signals at four input terminals thereof, and outputs an active STOP CODE signal when all the above input signals are active. The active STOP CODE signal indicates that the STOP CODE of CODE128 is detected. Table 3 indicates the bar width patterns of the START CODE A, B, and C, and STOP CODE in CODE128, where each bar width is indicated by a multiple of a minimum bar width of an element, and Table 4 indicates the above four input signals of the AND gates 52 to 55.

TABLE 3

RELATIONSHIP TO BE DETECTED FOR START/STOP CODES IN CODE128

| START/STOP CODE | PATTERN TO BE DETECTED (TERMINAL NUMBERS) | | | | SCAN DIREC-TION |
|---|---|---|---|---|---|
| | 1 | 2 | 3 | 4 | |
| START CODE A | 48< | 49> | 50= | 51< | RIGHT TO LEFT |
| START CODE B | 48< | 49> | 50= | 51> | RIGHT TO LEFT |
| START CODE C | 48< | 49> | 50> | 51= | RIGHT TO LEFT |
| STOP CODE | 48< | 49= | 50> | 51> | LEFT TO RIGHT |

TABLE 4

PATTERNS OFR START/STOP CODES IN CODE128

| CODE | PATTERN | | | | | |
|---|---|---|---|---|---|---|
| | B | S | B | S | B | S |
| START CODE A | 2 | 1 | 1 | 4 | 1 | 2 |
| START CODE B | 2 | 1 | 1 | 2 | 1 | 4 |
| START CODE C | 2 | 1 | 1 | 2 | 3 | 2 |

| CODE | PATTERN | | | | | | |
|---|---|---|---|---|---|---|---|
| | B | S | B | S | B | S | B |

TABLE 4-continued

PATTERNS OFR START/STOP CODES IN CODE128

| STOP CODE | 2 | 3 | 3 | 1 | 1 | 1 | 2 |

B: WIDTH OF BLACK ELEMENT (BAR)
S: WIDTH OF WHITE ELEMENT (SPACE)

Figure 21:
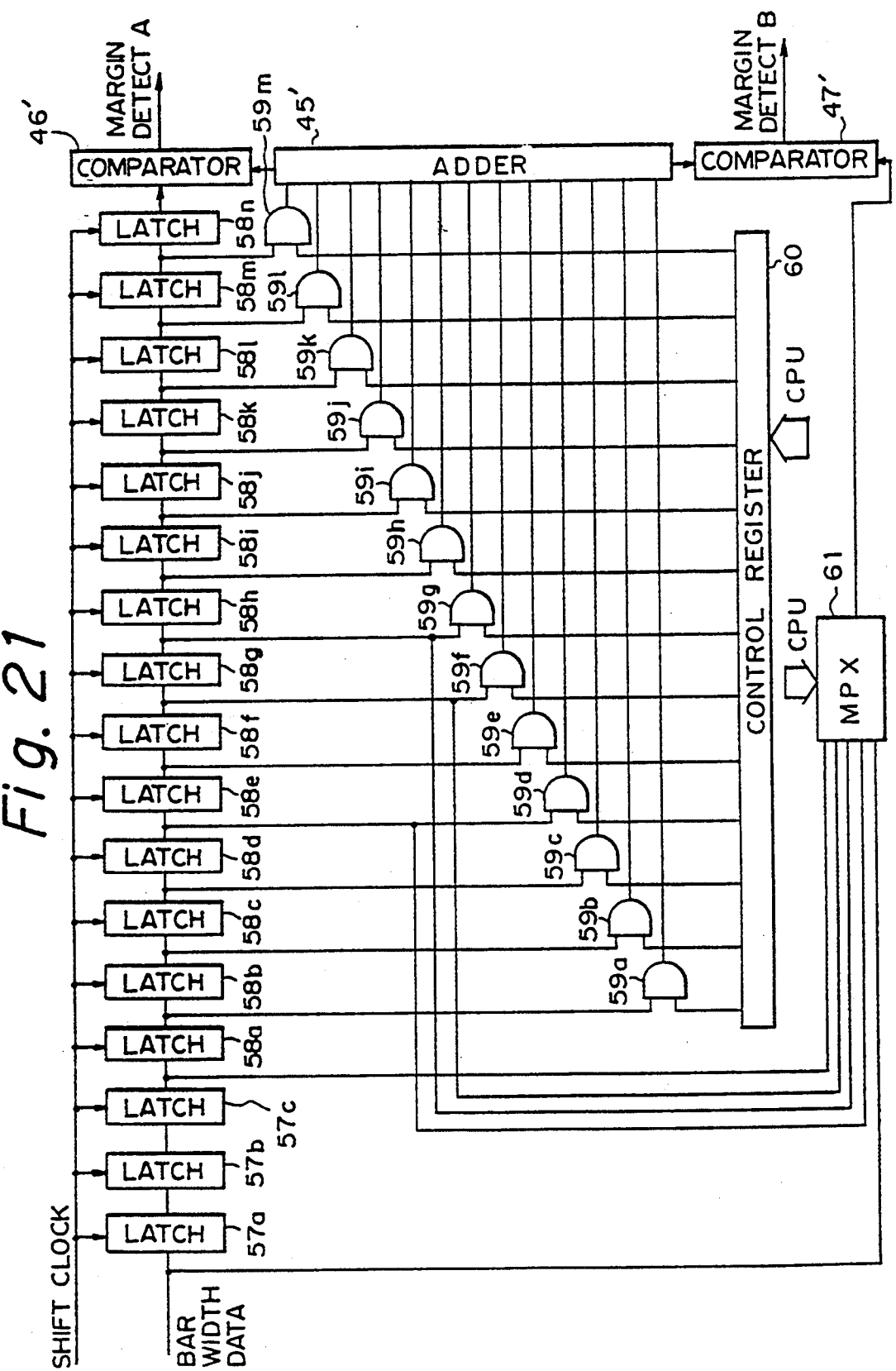
FIG. 21 is a block diagram depicting a device for detecting margins according to an eighth embodiment.

Eighth Embodiment (FIG. 21)

FIG. 21 is a block diagram depicting a device for detecting margins according to the eighth embodiment.

The device of FIG. 21 is provided to obtain the margin detect A signal and the margin detect B signal for the bar codes of CODE39, CODE93, CODE128, NW7, and ITF. In FIG. 21, reference numeral 45' denotes an adder, 46' and 47' each denote a comparator, 60 denotes a control register, and 61 denotes a multiplexer.

The successive bar width data generated in the bar width counter 122 is supplied to the latch circuit 57a, and latched therein synchronizing with the shift clock signal. Then, the latched bar width data is shifted through the series of latch circuits 57a to 57c and 58a to 58n one by one synchronizing with the shift clock signal. Namely, seven bar width data successively output from the bar width counter 122 are latched in the latch circuits 57a to 57c and 58a to 58n. The outputs of the latch circuits 58a to 58m are applied through the corresponding AND gates 59a to 59m to the adder 45'. The adder 45' obtains a sum of the bar widths output from a predetermined portion of the latch circuits 58a to 58m, where the AND gates corresponding to the predetermined portion are made open by the outputs of the control register 60. The control register 60 has a plurality of bits corresponding to the AND gates 59a to 59m, and the output of each bit is applied to one input terminal of the corresponding AND gate. The CPU 113 presets these bits of the control register 60, so that the above predetermined portion of the AND gates 59a to 59m are made open. The predetermined portion is determined for the type of bar code as indicated in Table 5. The setting of Table 5 is determined based on the fact that each CODE39 character is constituted by nine elements, each CODE93 or CODE128 character is constituted by six elements, and each NW7 character is constituted by seven elements. For the ITF bar codes, bar width data of ten successive elements near either of the margins on both sides of a bar code excluding the three elements nearest to the margin which correspond to a start or stop pattern, are summed in the adder 45'. The comparator 46' compares the output of the latch circuit 58n with the output of the adder 45'. When the latch circuit 58n latches bar width data of a margin followed by a character, the comparator 46' outputs an active MARGIN DETECT A signal. The multiplexer 61 is provided to select bar width data which is to be applied to the comparator 47' for comparing with the output of the adder 45'. For a CODE39 bar code, the multiplexer 61 selects an output of the latch circuit 58d. For a CODE93 or CODE128 bar code, the multiplexer 61 selects an output of the latch circuit 58g. For a NW7 bar code, the multiplexer 61 selects an output of the latch circuit 58f. For a ITF bar code, the multiplexer 61 selects the bar width data last supplied to the construction of FIG. 21, which is applied to the input side of the latch circuit 57a. When the output of the multiplexer 61 is bar width data of a margin following a character, the comparator 47' outputs an active MARGIN DETECT B signal.

TABLE 5

SETTING IN GATE REGISTER 60 FOR VARIOUS TYPES OF BAR CODES

| TYPE OF BAR CODE | AND GATES | | | | | | | | | | | | |
|---|---|---|---|---|---|---|---|---|---|---|---|---|---|
| | 59a | 59b | 59c | 59d | 59e | 59f | 59g | 59h | 59i | 59j | 59k | 59l | 59m |
| CODE39 | x | x | x | x | o | o | o | o | o | o | o | o | o |
| CODE93 | x | x | x | x | x | x | x | o | o | o | o | o | o |
| CODE128 | x | x | x | x | x | x | x | o | o | o | o | o | o |
| NW7 | x | x | x | x | x | x | o | o | o | o | o | o | o |
| ITF | o | o | o | o | o | o | o | o | o | o | x | x | x | o: active
x: inactive

Figure 22:
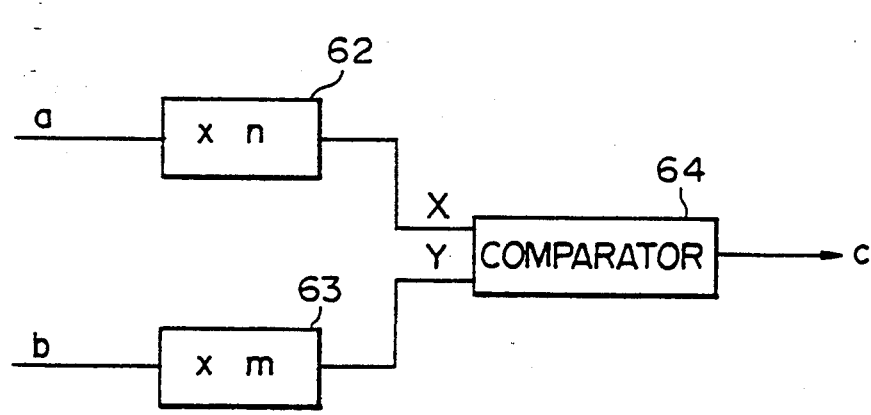
FIG. 22 is a diagram depicting the comparators 46 and 47 in FIG. 20 and 46' and 47' in FIG. 21.

Comparators 46 and 47 in FIG. 20 and 46' and 47' in FIG. 21 (FIG. 22)

FIG. 22 is a diagram depicting construction of the comparators 46 and 47 in FIG. 20 and 46' and 47' in FIG. 21. In FIG. 22, reference numerals 62 and 63 each denote a multiplier, and 64 denotes a comparator. As shown in FIG. 22, when comparing two quantities a and b in the above comparators, one quantity a is multiplied by an integer n, and the other quantity b is multiplied by an integer m, and then, it is determined which is larger between the multiplied quantities $n \times a$ and $m \times b$. Table 6 indicates preferable values of the above n and m, together with the lengths of margins to be detected, and the lengths of characters compared with the lengths of margins, respectively for CODE39, CODE93, CODE128, NW7, and ITF. In addition, Table 6 indicates effective threshold values (Th) realized by the above preferable values of n and m when comparing the above quantities a and b with the values n and m. All lengths are indicated by multiples of a minimum bar width X of an element.

TABLE 6

SETTING IN GATE REGISTER 60 FOR VARIOUS TYPES OF BAR CODES

| TYPE OF BAR CODE | n | m | Th | LENGTH OF MARGIN | LENGTH OF CHARACTER |
|---|---|---|---|---|---|
| CODE39 | 2 | 1 | 6.0× TO 7.5× | 10× | 12× TO 15× |
| CODE93 | 3 | 2 | 6× | 10× | 9× |
| CODE128 | 3 | 2 | 7.3× | 10× | 11× |
| NW7 | 3 | 2 | 6.0× TO 8.6× | 10× | 9× TO 13× |
| ITF | 5 | 2 | 5.2× TO 7.2× | 10× | 14× TO 18× |

Th: THRESHOLD FOR DETECTING MARGIN
X: MINIMUM BAR WIDTH OF AN ELEMENT

Figure 23:
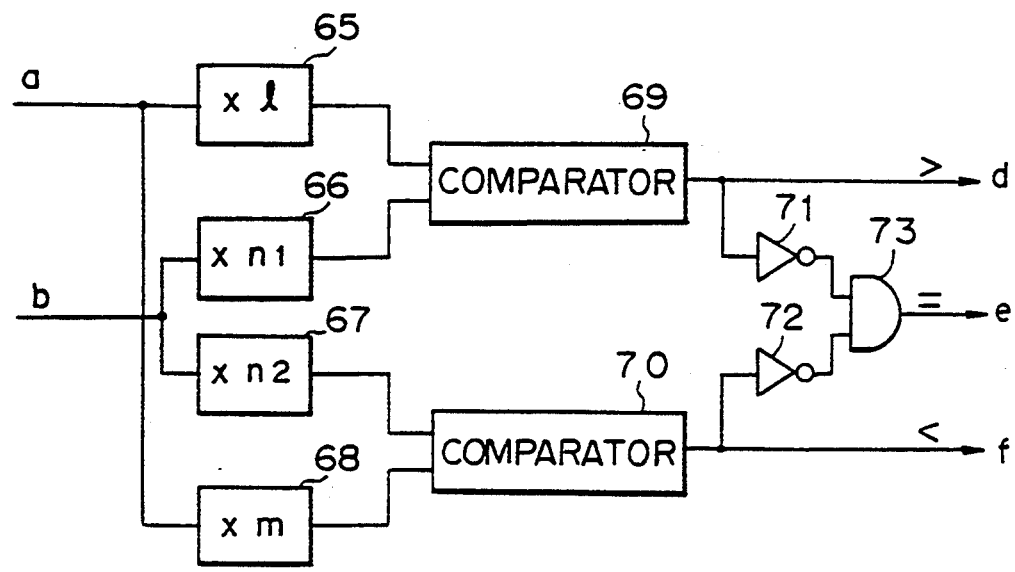
FIG. 23 is a diagram depicting the comparators 48 to 51 in FIG. 20.

Comparators 48 to 51 in FIG. 20 (FIG. 23)

FIG. 23 is a diagram depicting construction of the comparators 48 to 51 in FIG. 20. In FIG. 23, reference numerals 65 to 68 each denote a multiplier, 69 and 70 each denote a comparator, 71 and 72 each denote an inverter, and 73 denotes an AND gate. As shown in FIG. 23, when comparing two quantities a and b in the construction of FIG. 23, one quantity a is multiplied by an integer 1 in the multiplier 65, and is multiplied by an integer m in the multiplier 68. Parallel to these multiplications, the other quantity b is multiplied by an integer n1 in the multiplier 66, and is multiplied by an integer n2 in the multiplier 67. Then, the multiplied quantities $1 \times a$ and $n1 \times b$ are compared in the comparator 69, and the multiplied quantities $m \times a$ and $n2 \times b$ are compared in the comparator 70, where $1 > m$. When the quantity $1 \times a$ is larger than the quantity $n1 \times b$, the comparator 69 outputs an active signal d which indicates that it is determined the quantity a is larger than the quantity b. When the quantity $n2 \times b$ is larger than the quantity $m \times a$, the comparator 70 outputs an active signal f which indicates that it is determined the quantity b is larger than the quantity a. When both the comparators 69 and 70 output an inactive signal, the AND gate 73 outputs an active signal e which indicates that the quantities a and b are determined to be equal.

Both the constructions of FIGS. 22 and 23 are provided based on the recognition that all widths of printed bar codes should contain an error due to variations in printing conditions. For example, $1=0.75$, $n1=n2=1$, and $m=1.25$ are preset in the construction of FIG. 23, the above signal d is active when $0.75a > b$, the above signal e is active when $1.25a > = b > = 0.75a$, and the above signal f is active when $1.25a < b$.

Figure 24:
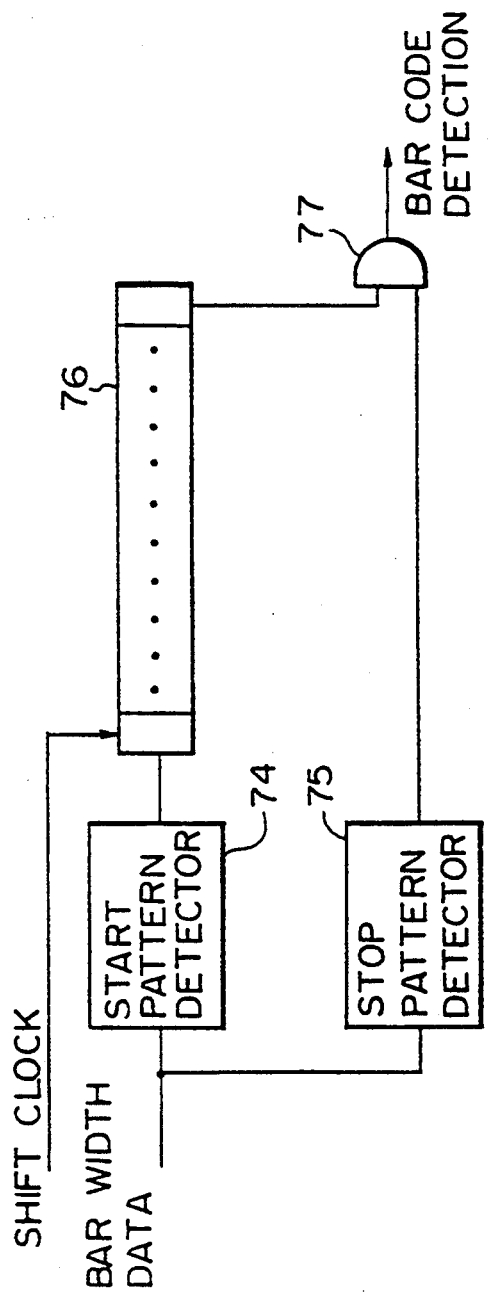
FIG. 24 is a diagram depicting a construction of a device for detecting a bar code by detecting a start pattern and a stop pattern.

Ninth Embodiment (FIG. 24)

FIG. 24 is a diagram depicting a device for detecting a bar code by detecting a start pattern and a stop pattern. In FIG. 24, reference numeral 74 denotes a start pattern detection circuit, 75 denotes a stop pattern detection circuit, 76 denotes a shift register, and 77 denotes an AND gate. The start pattern detection circuit 74, the stop pattern detection circuit 75, and the shift register 76, are provided according to the respective bar code types (standards). Namely, the number of stages in the shift register 76 is set so that the number is equal to the number of elements in a bar code symbol. The start pattern detection circuit 74 is designed to output an active signal when a start pattern (character) and a stop pattern, which are stipulated by the corresponding bar code standard, are scanned in the direction from a margin preceding the start or stop pattern. The stop pattern detection circuit 75 is designed to output an active signal when the above start pattern or stop pattern (character) is scanned in the direction from the pattern to a margin following the pattern. Thus, the output of the AND gate 77 because it is performing a coincidence detection operation, becomes active when a bar code of the type to be detected is detected.

In addition, when an additional AND gate is provided in the device of FIG. 24, and the input terminal of the AND gate is connected to the output of the stop pattern detection circuit 75 and one of intermediate stages of the shift register 76; a second bar code having a character length different from the full length of the shift register 76 may be detected by an active output of the additional AND gate, where the number of stages from the input of the shift register 76 to the intermediate stage is set equal to the character length of the second bar code.

Figure 25:
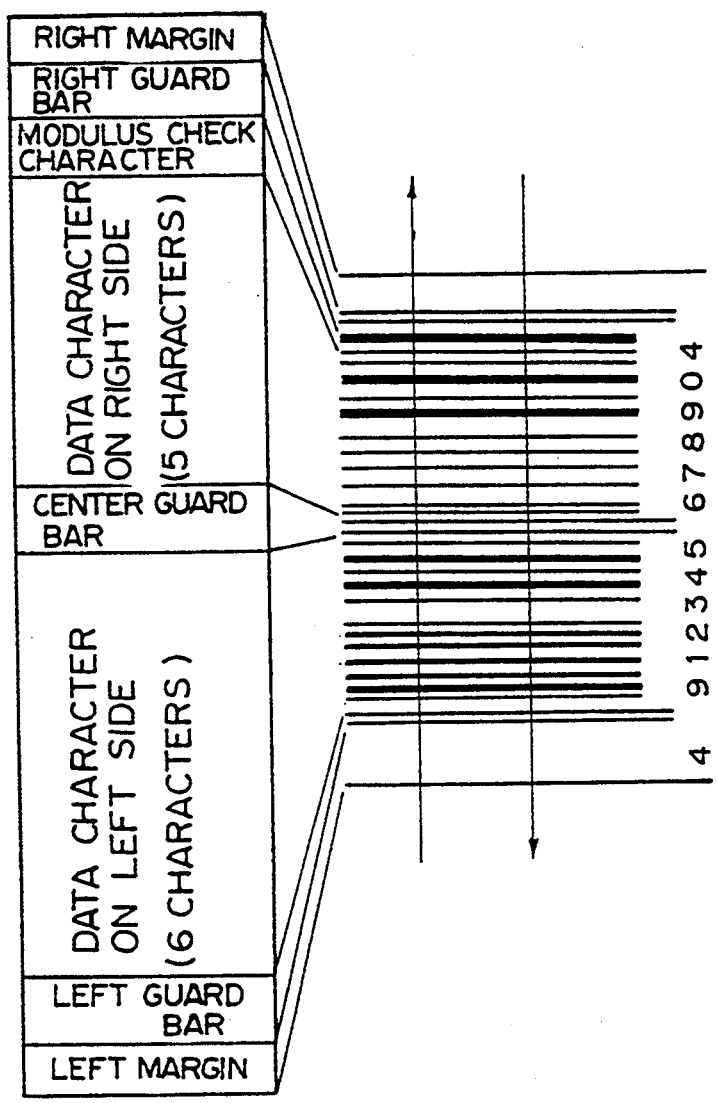
FIG. 25 is a diagram indicating a structure of JAN13 as an example of the UPC codes.
Figure 26:
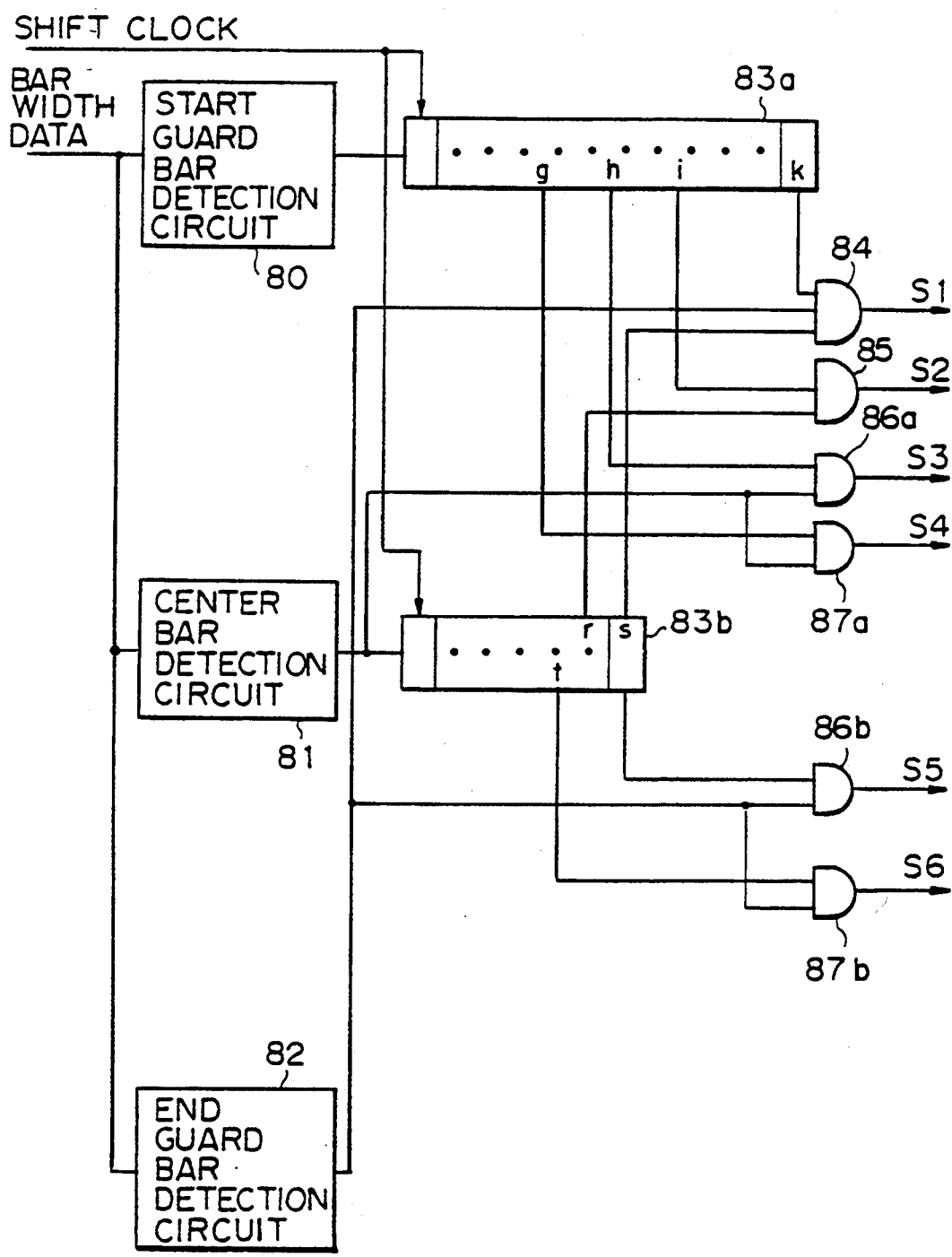
FIG. 26 is a block diagram depicting a device for realizing the bar code detection logic circuit 123 and the buffer memories 124 and 125 in FIG. 4 in the tenth embodiment.

Tenth Embodiment (FIGS. 25 and 26)

FIG. 25 is a diagram illustrating a JAN13 (equivalent to EAN13) code as an example of the UPC codes. As shown in FIG. 25, a UPC code comprises a blank portion called a left margin, a left guard bar, a center guard bar, a right guard bar, a right margin, six characters (called left block) between the left guard bar and the center guard bar, and six characters (called right block, and including one modulus check character) between the center guard bar and the right guard bar. The right block and the left block can be read independently. Then, a modulus ten check is carried out for the characters in the sequence of the left and right blocks. Although a JAN13 code contains twelve characters, a thirteenth character is determined based on the pattern of the left block. Although not explained, the structure of a JAN8 (EAN8) code is similar to the above JAN13 code except that the number of the characters in each of the left and right blocks is equal to four.

FIG. 26 is a block diagram depicting a device for realizing the bar code detection logic circuit 123 and the buffer memories 124 and 125 in FIG. 4 in the tenth embodiment. The construction of FIG. 26 is provided to detect the UPC codes. In FIG. 26, reference numeral 80 denotes a start guard bar detection circuit, 81 denotes a center guard bar detection circuit, 82 denotes an end guard bar detection circuit, 83a and 83b each denote a shift register, and 84 to 87b each denote an AND gate. Each of the AND gates 84 to 87b perform coincidence detection. The above "start guard bar" means a guard bar which is detected following a margin, and the above "end guard bar" means a guard bar which is detected preceding a margin. The center guard bar is located at the center of symmetry.

In the construction of FIG. 26, the start guard bar detection circuit 80 detects the above start guard bar, the center guard bar detection circuit 81 detects the above center guard bar, and the end guard bar detection circuit 82 detects the above end guard bar. The shift register 83a contains a plurality of stages corresponding to a total number of elements between the left and right margins in a UPC code (corresponding to a full length of a JAN13 bar code), and the shift register 83b contains a plurality of stages corresponding to the number of elements before the center guard bar in a UPC code. The shift register 83a has four output terminals respectively denoted by g, h, i, and k, as a result, register 83a can provide four output delays where the output terminal k corresponds to the full length of a JAN13 code, the output terminal i corresponds to the full length of a JAN8 code, and the output terminal h corresponds to the length from the start guard bar to the center guard bar in a JAN13 code, and the output terminal g corresponds to the length from the start guard bar to the center guard bar in a JAN8 code. The shift register 83b has three output terminals respectively denoted by t, r, and s and capable of providing multiple delays. The output terminal s corresponds to the length from the center guard bar to the end guard bar in a JAN13 code, the output terminal r corresponds to the length from the start guard bar to the center guard bar in a JAN8 code, and the output terminal t corresponds to the length from the center guard bar to the end guard bar in a JAN8 code. The AND gate 84 receives the output from the terminal k in the shift register 83a, the output of the end guard bar detection circuit 82, and the output from the terminal s of the shift register 83b. Thus, the AND gate 84 outputs an active signal S1 when a start guard bar, a center guard bar, an end guard bar of a JAN13 code are detected, the AND gate 85 outputs an active signal S2 when a start guard bar, a center guard bar, and an end guard bar of a JAN8 code are detected, the AND gate 86a outputs an active signal S3 when a start guard bar and a center guard bar of a JAN13 code are detected, the AND gate 87a outputs an active signal S4 when a start guard bar and a center guard bar of a JAN8 code are detected, the AND gate 86b outputs an active signal S5 when a center guard bar and an end guard bar of a JAN13 code are detected, the AND gate 87b outputs an active signal S6 when a center guard bar and an end guard bar of a JAN8 code are detected.

The above detection signals S1 to S6 are supplied to the CPU 113. These signals may be used by the CPU 113 as status flags when reading the UPC codes.

We claim:

1. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code said fast screening means comprising:

first margin detecting means for detecting a bar width corresponding to a first margin output from said bar width detecting means;

second margin detecting means for detecting a bar width corresponding to a second margin output from said bar width detecting means, following a bar width corresponding to one of the elements in said bar code;

both-side margin detecting means for detecting a sequence of the first and second margins by the detection of the bar width corresponding to said second margin after the detection of the bar width corresponding to said first margin;

interrupt generating means for generating an interrupt signal to be supplied to said bar code decoding means when said both-side margin detecting means detects the sequence of the bar width corresponding to said second margin after the detection of the bar width corresponding to said first margin; and interrupt indicating means for indicating a number of said interrupt signals where the interrupt signals have been generated by said interrupt generating means, and the bar codes corresponding to the interrupt signals have not been decoded by said bar code decoding means; and bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition.

2. A bar code reader according to claim 1, wherein said fast screening means further comprises:

shift register means, having a plurality of odd and even numbered stages, for serially inputting said bar width output from said bar width detecting means, shifting through the plurality of stages when the bar width detecting means outputs a bar width, and outputting in parallel bar widths held in the respective stages;

first comparator means for comparing plural bar widths output from the odd-numbered stages in said register; and second comparator means for comparing plural bar widths output from the even-numbered stages in said shift register.

3. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code, said fast screening means comprising:

first margin detecting means for detecting a bar width corresponding to a first margin output from said bar width detecting means; and second margin detecting means for detecting a bar width corresponding to a second margin output from said bar width detecting means, following a bar width corresponding to one of the elements in said bar code;

bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition;

unit length counting means for counting a number of the elements for which said bar widths are output from said bar width detecting means after said first margin detecting means detects the bar width corresponding to said first margin, and for detecting a first timing at which said number reaches a multiple of a predetermined number; and coincidence detecting means for detecting a coincidence of said first timing detected by said unit length counting means, with a second timing at which said second margin detecting means detects the bar width corresponding to said second margin.

4. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code, said fast screening means comprising:

first margin detecting means for detecting a bar width corresponding to a first margin output from said bar width detecting means; and second margin detecting means for detecting a bar width corresponding to a second margin output from said bar width detecting means, following a bar width corresponding to one of the elements in said bar code;

bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition;

element length counting means for counting a number of the elements for which said bar widths are output from said bar widths detecting means after said first margin detecting means detects the bar width corresponding to said first margin, and for detecting a first timing at which said number reaches a sum of a multiple of a first predetermined number and a second predetermined number; and coincidence detecting means for detecting a coincidence of said first timing detected by said element length counting means, with a second timing detected by said second margin detecting means detects the bar width corresponding to said second margin.

5. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code, said fast screening means comprising:

first margin detecting means for detecting a bar width corresponding to a first margin output from said bar width detecting means;

second margin detecting means for detecting a bar width corresponding to a second margin output from said bar width detecting means, following a bar width corresponding to one of the elements in said bar code;

both-side margin detecting means for detecting a sequence of the first and second margins by the detection of the bar width corresponding to said second margin after the detection of the bar width corresponding to said first margin;

shift register means, having a plurality of successive stages including intermediate and final, for serially inputting said bar width output from said bar width detecting means, shifting through the plurality of stages when the bar width detecting means outputs a bar width, and outputting in parallel the bar widths held in the respective stages;

adder means for obtaining a sum of outputs of predetermined successive stages of said shift register means;

first comparator means for comparing an output from the final stage of said shift register with said sum; and second comparator means for comparing an output of the intermediate stage of said shift register with said sum; and bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition.

6. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code, said fast screening means comprising:

start pattern detecting means for detecting a first pattern of successive bar widths which indicates a location of a first character of the bar code, and outputting a first active output when said first pattern is detected;

stop pattern detecting means for detecting a second pattern of successive bar widths which indicates a location of a last character of the bar code, and outputting a second active output when said second pattern is detected;

delay means for delaying said first active output by a time corresponding to a predetermined number of the elements between said first and second patterns in the bar code of a type; and coincidence detecting means for detecting a coincidence of said first active output delayed by said delay means with said second active output; and bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition.

7. A bar code reader using a high speed scanner, comprising:

scanning means for scanning with a scanning beam a surface of an article on which a bar code comprised of a plurality of elements is printed, and outputting a signal with two levels, the levels are determined based on whether portions of the surface currently scanned are black or white with the levels having durations;

bar width detecting means for successively detecting and outputting widths of the respective durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of widths constituting a complete bar code, said fast screening means comprising:

start guard bar detecting means for detecting a first pattern of successive bar widths which indicates a location of a first character of the bar code, and outputting a first active output when said first pattern is detected;

stop guard bar detecting means for detecting a second pattern of successive bar widths which indicates a location of a last character of the bar code, and outputting a second active output when said second pattern is detected;

center guard bar detecting means for detecting a third pattern of successive bar widths which indicates a center between said first and second patterns, and outputting a third active output when said third pattern is detected;

first delay means for delaying said first active output by a time corresponding to a first predetermined number of elements between said first and second patterns in the bar code of a type, and outputting a first delayed active signal;

second delay means for delaying said second active output by a time corresponding to a second predetermined number of elements between said first and third patterns in the bar code of the type, and outputting a second delayed active signal;

third delay means for delaying said second active output by a time corresponding to a third predetermined number of elements between said third and second patterns in the bar code of the type, and outputting a third delayed active signal;

first coincidence detecting means for detecting a coincidence of said first delayed active signal with said second active signal;

second coincidence detecting means for detecting a coincidence of said second delayed active signal with said third active signal; and third coincidence detecting means for detecting a coincidence of said third delayed active signal with said second active signal; and bar code decoding means for reading the set of successive widths from the addresses of the bar width storing means where the address is generated by the address generating means, and for decoding a bar code constituted by the set of successive widths when the fast screening means determines that the set of successive widths satisfies said predetermined condition.

8. A bar code reader using a high speed scanner, comprising:

scanning means for scanning with a scanning beam a surface of an article on which a bar code comprised of a plurality of elements is printed, and outputting a signal of two levels, the levels are determined based on whether portions of the surface currently scanned are black or white with the levels having durations;

bar width detecting means for successively detecting and outputting widths of the durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of successive widths constituting a complete bar code;

type of bar code detecting means for detecting a type of the bar code, the widths of the elements of which are detected by the bar width detecting means, based on the detected widths when the fast screening means determines that the set of successive widths satisfies the predetermined condition;

address & type storing means for storing the type of bar code detected by the type of bar code detecting means, together with the addresses generated by the address generating means for the widths of the bar code; and bar code decoding means, provided with a plurality of specific type decoding means, for respectively decoding a plurality of types of bar codes and said fast screening means and said type of bar code detecting means comprising a plurality of bar code detection logic circuits each for detecting a bar code of a specific type.

9. A bar code reader according to claim 8, further comprising selector means for selecting one of said plurality of bar code detection logic circuits.

10. A bar code reader using a high speed scanner, comprising:
  scanning means for scanning with a scanning beam a surface of an article on which a bar code comprised of a plurality of elements is printed, and outputting a signal of two levels, the levels are determined based on whether portions of the surface currently scanned are black or white with the levels having durations;
  bar width detecting means for successively detecting and outputting widths of the durations where the levels are unchanged;
  bar width storing means for storing the widths detected by the bar width detecting means;
  address generating means for generating an address within the bar width storing means at which each of the widths is to be stored;
  fast screening means for determining whether a set of successive widths successively detected by the bar width detecting means satisfies a predetermined condition for the set of successive widths constituting a complete bar code;
  type of bar code detecting means for detecting a type of the bar code, the widths of the elements of which are detected by the bar width detecting means, based on the detected widths when the fast screening means determines that the set of successive widths satisfies the predetermined condition;
  address & type storing means for storing the type of bar code detected by the type of bar code detecting means, together with the addresses generated by the address generating means for the widths of the bar code and, said address & type storing means containing a plurality of storage areas corresponding to a plurality of types of bar codes; and
  bar code decoding means, provided with a plurality of specific type decoding means, for respectively decoding a plurality of types of bar codes.

11. A bar code reader using a high speed scanner, comprising:
  scanning means for scanning with a scanning beam a surface of an article on which a bar code comprised of a plurality of elements is printed, and outputting a signal of two levels, the levels are determined based on whether portions of the surface currently scanned are black or white with the levels having durations;
  bar width detecting means for successively detecting and outputting widths of the durations where the levels are unchanged;
  bar width storing means for storing the widths detected by the bar width detecting means;
  address generating means for generating an address within the bar width storing means at which each of the widths is to be stored;
  fast screening means for determining whether a set of successive widths successively detected by the bar width detecting means satisfies a predetermined condition for the set of successive widths constituting a complete bar code;
  type of bar code detecting means for detecting a type of the bar code, the widths of the elements of which are detected by the bar width detecting means, based on the detected widths when the fast screening means determines that the set of successive widths satisfies the predetermined condition;
  address & type storing means for storing the type of bar code detected by the type of bar code detecting means together with the addresses generated by the address generating means for the widths of the bar code; and
  bar code decoding means, provided with a plurality of specific type decoding means, for respectively decoding a plurality of types of bar codes.

12. A bar code reader according to claim 11, wherein said fast screening means and said type of bar code detecting means comprise a hardware logic circuit, and said bar code decoding means comprises software.

13. A bar code reader according to claim 11, wherein said fast screening means and said type of bar code detecting means comprise:
  first margin detecting means for detecting a bar width corresponding to a first margin output from said bar width detecting means; and
  second margin detecting means for detecting a bar width corresponding to a second margin output from said bar width detecting means, following a bar width corresponding to one of the elements in said bar code.

14. A bar code reader according to claim 13, wherein said fast screening means and said type of bar code detecting means further comprise both-side margin detecting means for detecting a sequence of the first and second margins by the detection of the bar width corresponding to said second margin after the detection of the bar width corresponding to said first margin.

15. A bar code reader according to claim 14, wherein said fast screening means and said type of bar code detecting means further comprise interrupt generating means for generating an interrupt signal to be supplied to said bar code decoding means when said both-side margin detecting means detects the sequence of the detection of the bar width corresponding to said second margin after the detection of the bar width corresponding to said first margin.

16. A bar code reader according to claim 15, further comprising:
  first address latch means for latching the address generated by said address generating means when said first margin detecting means detects the bar width corresponding to said first margin;
  second address latch means for latching the address generated by said address generating means when said second margin detecting means detects the bar width corresponding to said second margin; and
  address memorizing means for storing said addresses latched in said first and second address latching means when said interrupt signal is generated by said interrupt signal generating means.

17. A bar code reader according to claim 14, wherein said fast screening means and said type of bar code detecting means further comprise interrupt indicating means for indicating a number of said interrupt signals where the interrupt signals have been generated by said interrupt generating means, and the bar codes corresponding to the interrupt signals have not been decoded by said bar code decoding means.

18. A bar code reader according to claim 14, further comprising number-of-elements counting means for counting a number of the elements for which said bar widths are output from said bar width detecting means after said first margin detecting means detects the bar width corresponding to said first margin and until said second margin detecting means detects the bar width corresponding to said second margin.

19. A bar code reader according to claim 18, further comprising number-of-elements comparing means for comparing said number of the elements counted by said number-of-elements counting means, with a predetermined references value.

20. A bar code reader using a high speed scanner, comprising:
scanning means for scanning with a scanning beam a surface of an article on which a bar code comprised of a plurality of elements is printed, and outputting a signal of two levels, the levels are determined based on whether portions of the surface currently scanned are black or white with the levels having durations;
bar width detecting means for successively detecting and outputting widths of the durations where the levels are unchanged;
bar width storing means for storing the widths detected by the bar width detecting means;
address generating means for generating an address within the bar width storing means at which each of the widths is to be stored;
fast screening means for determining whether a set of successive widths successively detected by the bar width detecting means satisfies a predetermined condition for the set of successive widths constituting a complete bar code, said fast screening means comprising:
first margin detecting means for detecting a bar width corresponding to a first margin output from said bar width detecting means; and
second margin detecting means for detecting a bar width corresponding to a second margin output from said bar width detecting means, following a bar width corresponding to one of the elements in said bar code;
type of bar code detecting means for detecting a type of the bar code, the widths of the elements of which are detected by the bar width detecting means, based on the detected widths when the fast screening means determines that the set of successive widths satisfies the predetermined condition;
address & type storing means for storing the type of bar code detected by the type of bar code detecting means, together with the addresses generated by the address generating means for the widths of the bar code;
bar code decoding means, provided with a plurality of specific type decoding means, for respectively decoding a plurality of types of bar codes;
unit length counting means for counting a number of the elements for which said bar widths are output from said bar width detecting means after said first margin detecting means detects the bar width corresponding to said first margin, and detecting a first timing at which said number reaches a multiple of a predetermined number; and
coincidence detecting means for detecting a coincidence of said first timing detected by said unit length counting means, with a second timing at which said second margin detecting means detects the bar width corresponding to said second margin.

21. A bar code reader using a high speed scanner, comprising:
scanning means for scanning with a scanning beam a surface of an article on which a bar code comprised of a plurality of elements is printed, and outputting a signal of two levels, the levels are determined based on whether portions of the surface currently scanned are black or white with the levels having durations;
bar width detecting means for successively detecting and outputting widths of the durations where the levels are unchanged;
bar width storing means for storing the widths detected by the bar width detecting means;
address generating means for generating an address within the bar width storing means at which each of the widths is to be stored;
fast screening means for determining whether a set of successive widths successively detected by the bar width detecting means satisfies a predetermined condition for the set of successive widths constituting a complete bar code, said fast screening means comprising:
first margin detecting means for detecting a bar width corresponding to a first margin output from said bar width detecting means; and
second margin detecting means for detecting a bar width corresponding to a second margin output from said bar width detecting means, following a bar width corresponding to one of the elements in said bar code;
type of bar code detecting means for detecting a type of the bar code, the widths of the elements of which are detected by the bar width detecting means, based on the detected widths when the fast screening means determines that the set of successive widths satisfies the predetermined condition;
address & type storing means for storing the type of bar code detected by the type of bar code detecting means, together with the addresses generated by the address generating means for the widths of the bar code;
bar code decoding means, provided with a plurality of specific type decoding means, for respectively decoding a plurality of types of bar codes,
element length counting means for counting a number of the elements for which said bar widths are output from said bar width detecting means after said first margin detecting means detects the bar width corresponding to said first margin, and detecting a first timing at which said number reaches a sum of a multiple of a first predetermined number and a second predetermined number; and
coincidence detecting means for detecting a coincidence of said first timing detected by said element length counting means, with a second timing at which said second margin detecting means detects the bar width corresponding to said second margin.

22. A bar code reader using a high speed scanner, comprising:
scanning means for scanning with a scanning beam a surface of an article on which a bar code comprised of a plurality of elements is printed, and outputting a signal of two levels, the levels are determined based on whether portions of the surface currently scanned are black or white with the levels having durations;

bar width detecting means for successively detecting and outputting widths of the durations where the levels are unchanged;

bar width storing means for storing the widths detected by the bar width detecting address generating means for generating an address within the bar width storing means at which each of the widths is to be stored;

fast screening means for determining whether a set of successive widths successively detected by the bar width detecting means satisfies a predetermined condition for the set of successive widths constituting a complete bar code, said fast screening means comprising:

first margin detecting means for detecting a bar width corresponding to a first margin output from said bar width detecting means;

second margin detecting means for detecting a bar 20 width corresponding to a second margin output from said bar width detecting means, following a bar width corresponding to one of the elements in said bar code;

both-side margin detecting means for detecting a sequence of the first and second margins by the detection of the bar width corresponding to said second margin after the detection of the bar width corresponding to said first margin;

shift register means, having a plurality of odd and even numbered stages, for serially inputting said bar width output from said bar width detecting means, shifting through the plurality of stages when the bar width detecting means outputs the bar width, and outputting in parallel the bar widths held in the respective stages;

first comparator means for comparing bar widths output from the odd-numbered stages in said shift register; and second comparator means for comparing bar widths output from the even-numbered stages in said shift register;

type of bar code detecting means for detecting a type of the bar code, the widths of the elements of which are detected by the bar width detecting means, based on the detected widths when the fast screening means determines that the set of successive widths satisfies the predetermined condition;

address & type storing means for storing the type of bar code detected by the type of bar code detecting means, together with the addresses generated by the address generating means for the widths of the bar code; and bar code decoding means, provided with a plurality of specific type decoding means, for respectively decoding a plurality of types of bar codes.

23. A bar code reader using a high speed scanner, comprising:

scanning means for scanning with a scanning beam a surface of an article on which a bar code comprised of a plurality of elements is printed, and outputting a signal of two levels, the levels are determined based on whether portions of the surface currently scanned are black or white with the levels having durations;

bar width detecting means for successively detecting and outputting widths of the durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of successive widths constituting a complete bar code, said fast screening means comprising:

said fast screening means comprising:

first margin detecting means for detecting a bar width corresponding to a first margin output from said bar width detecting means;

second margin detecting means for detecting a bar width corresponding to a second margin output from said bar width detecting means, following a bar width corresponding to one of the elements in said bar code;

both-side margin detecting means for detecting a sequence of the first and second margins by the detection of the bar width corresponding to said second margin after the detection of the bar width corresponding to said first margin;

shift register means, having a plurality of successive stages having an intermediate and final stage, for serially inputting said bar width output from said bar width detecting means, shifting through the plurality of stages when the bar width detecting means outputs the bar width, and outputting in parallel the bar widths held in the respective stages; and adder means for obtaining a sum of outputs of predetermined successive stages of said shift register means;

first comparator means for comparing an output from the final stage of said shift register with said sum; and second comparator means for comparing an output of the intermediate stage of said shift register with said sum;

type of bar code detecting means for detecting a type of the bar code, the widths of the elements of which are detected by the bar width detecting means, based on the detected widths when the fast screening means determines that the set of successive widths satisfies the predetermined condition;

address & type storing means for storing the type of bar code detected by the type of bar code detecting means, together with the addresses generated by the address generating means for the widths of the bar code; and bar code decoding means, provided with a plurality of specific type decoding means, for respectively decoding a plurality of types of bar codes.

24. A bar code reader using a high speed scanner, comprising:

scanning means for scanning with a scanning beam a surface of an article on which a bar code comprised of a plurality of elements is printed, and outputting a signal of two levels, the levels are determined based on whether portions of the surface currently scanned are black or white with the levels having durations;

bar width detecting means for successively detecting and outputting widths of the durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of successive widths constituting a complete bar code wherein said fast screening means comprising:

> start pattern detecting means for detecting a first pattern of successive bar widths which indicates a location of a first character of the bar code, and outputting a first active output when said first pattern is detected;
>
> stop pattern detecting means for detecting a second pattern of successive bar widths which indicates a location of a last character of the bar code, and outputting a second active output when said second pattern is detected;
>
> delay means for delaying said first active output by a time corresponding to a predetermined number of the elements between said first and second patterns in the bar code of an object type; and
>
> coincidence detecting means for detecting a coincidence of the first active output, delayed by said delay means, with said second active signal;

type of bar code detecting means for detecting a type of the bar code, the widths of the elements of which are detected by the bar width detecting means, based on the detected widths when the fast screening means determines that the set of successive widths satisfies the predetermined condition;

address & type storing means for storing the type of bar code detected by the type of bar code detecting means, together with the addresses generated by the address generating means for the widths of the bar code; and bar code decoding means, provided with a plurality of specific type decoding means, for respectively decoding a plurality of types of bar codes.

25. A bar code reader using a high speed scanner, comprising:

scanning means for scanning with a scanning beam a surface of an article on which a bar code comprised of a plurality of elements is printed, and outputting a signal of two levels, the levels are determined based on whether portions of the surface currently scanned are black or white with the levels having durations;

bar width detecting means for successively detecting and outputting widths of the durations where the levels are unchanged;

bar width storing means for storing the widths detected by the bar width detecting means;

address generating means for generating an address within the bar width storing means at which each of the widths is to be stored;

fast screening means for determining whether a set of successive widths successively detected by the bar width detecting means satisfies a predetermined condition for the set of successive widths constituting a complete bar code, said fast screening means comprising:

> start guard bar detecting means for detecting a first pattern of successive bar widths which indicates a location of a first character of the bar code, and outputting a first active output when said first pattern is detected;
>
> stop guard bar detecting means for detecting a second pattern of successive bar widths which indicates a location of a last character of the bar code, and outputting a second active output when said second pattern is detected;
>
> center guard bar detecting means for detecting a third pattern of successive bar widths which indicates a center between said first and second patterns, and outputting a third active output when said third pattern is detected;
>
> first delay means for delaying said first active output by a time corresponding to a first predetermined number of the elements between said first and third patterns in the bar code of a type, and outputting a first delayed active signal;
>
> second delay means for delaying said second active output by a time corresponding to a second predetermined number of the elements between said first and third patterns in the bar code of the type, and outputting a second delayed active signal;
>
> third delay means for delaying said second active output by a time corresponding to a third predetermined number of the elements between said third and second patterns in the bar code of the type, and outputting a third delayed active signal;
>
> first coincidence detecting means for detecting a coincidence of said first delayed active signal with said second active signal;
>
> second coincidence detecting means for detecting a coincidence of said second delayed active signal with said third active signal; and
>
> third coincidence detecting means for detecting a coincidence of said third delayed active signal with said second active signal;

type of bar code detecting means for detecting a type of the bar code, the widths of the elements of which are detected by the bar width detecting means, based on the detected widths when the fast screening means determines that the set of successive widths satisfies the predetermined condition;

address & type storing means for storing the type of bar code detected by the type of bar code detecting means, together with address generated by the address generating means for the widths of the bar code; and bar code decoding means, for respectively decoding a plurality of types of bar codes.

* * * * *

UNITED STATES PATENT AND TRADEMARK OFFICE
CERTIFICATE OF CORRECTION

PATENT NO. : 5,414,252  
DATED : May 9, 1995  
INVENTOR(S) : Shinoda et al.

Page 1 of 3

It is certified that error appears in the above-indentified patent and that said Letters Patent is hereby corrected as shown below:

```
Title Page, Second Column, under "Abstract",
          line 17, delete "detected";
          line 25, "unit" should be --units--;
Col. 2,   line 15, "the" should be --a-- and
          "a" should be --the--;
Col. 2, line 18, delete (2nd occur.) ",";
Col. 2, line 48, after "processing" (1st occur.) insert --,--;

Col. 3,   line 11, after "widths" insert --of--;
* Col. 4, line 16, after "device" delete "a";
Col. 4,   line 27, after "depicting" insert --storing--;
* Col. 4, line 47, delete "the";
Col. 6,   line 34, after "4" insert --,--;
Col. 6,   line 39, after "spotted" insert --or
          positioned--;
Col. 6,   line 49, "BY" should be --BAR--;
Col. 8,   line 33, after "character" insert --in--;
Col. 8,   line 34, before "CODE39" insert --the--;
* Col. 9, line 31, after "data" insert --,--;
* Col. 11, lines 58 and 59, delete "construction";
Col. 13, line 63, "by" should be --of--;
```

UNITED STATES PATENT AND TRADEMARK OFFICE
CERTIFICATE OF CORRECTION

PATENT NO. : 5,414,252
DATED : May 9, 1995
INVENTOR(S) : Shinoda et al.

It is certified that error appears in the above-indentified patent and that said Letters Patent is hereby corrected as shown below:

```
    Col. 13, line 66, "of" (first occurrence) should be
            --by--;
  * Col. 14, line 4, "When" should be --when--;
    Col. 16, line 9, "51=0" should be --51=--;
  * Col. 16, line 60, "OFR" should be --FOR--;
  * Col. 17, line 3, "OFR" should be --FOR--;
    Col. 19, line 51, after "77" insert --,--;
    Col. 20, line 45, "delays where the" should be
            --delays.  The--;
    Col. 22, line 15, after "said" insert --shift--;
    Col. 23, lines 52 and 53, "detected by" should be
            --at which--;
```

UNITED STATES PATENT AND TRADEMARK OFFICE
CERTIFICATE OF CORRECTION

PATENT NO. : 5,414,252
DATED : May 9, 1995
INVENTOR(S) : Shinoda et al.

It is certified that error appears in the above-indentified patent and that said Letters Patent is hereby corrected as shown below:

Col. 31, line 7, after "detecting" insert --means;--;

Col. 31, line 32, "output-from" should be --output from--;

Col. 34, line 56, "address" should be --the addresses--;

Col. 34, line 59, after "means," insert --provided with a plurality of specific type decoding means,--.

Signed and Sealed this

Fifth Day of December, 1995

Attest:

BRUCE LEHMAN

Attesting Officer

Commissioner of Patents and Trademarks